Oct. 27, 1942.    H. ROSE    2,300,011
HEATER
Filed June 12, 1939    5 Sheets-Sheet 4

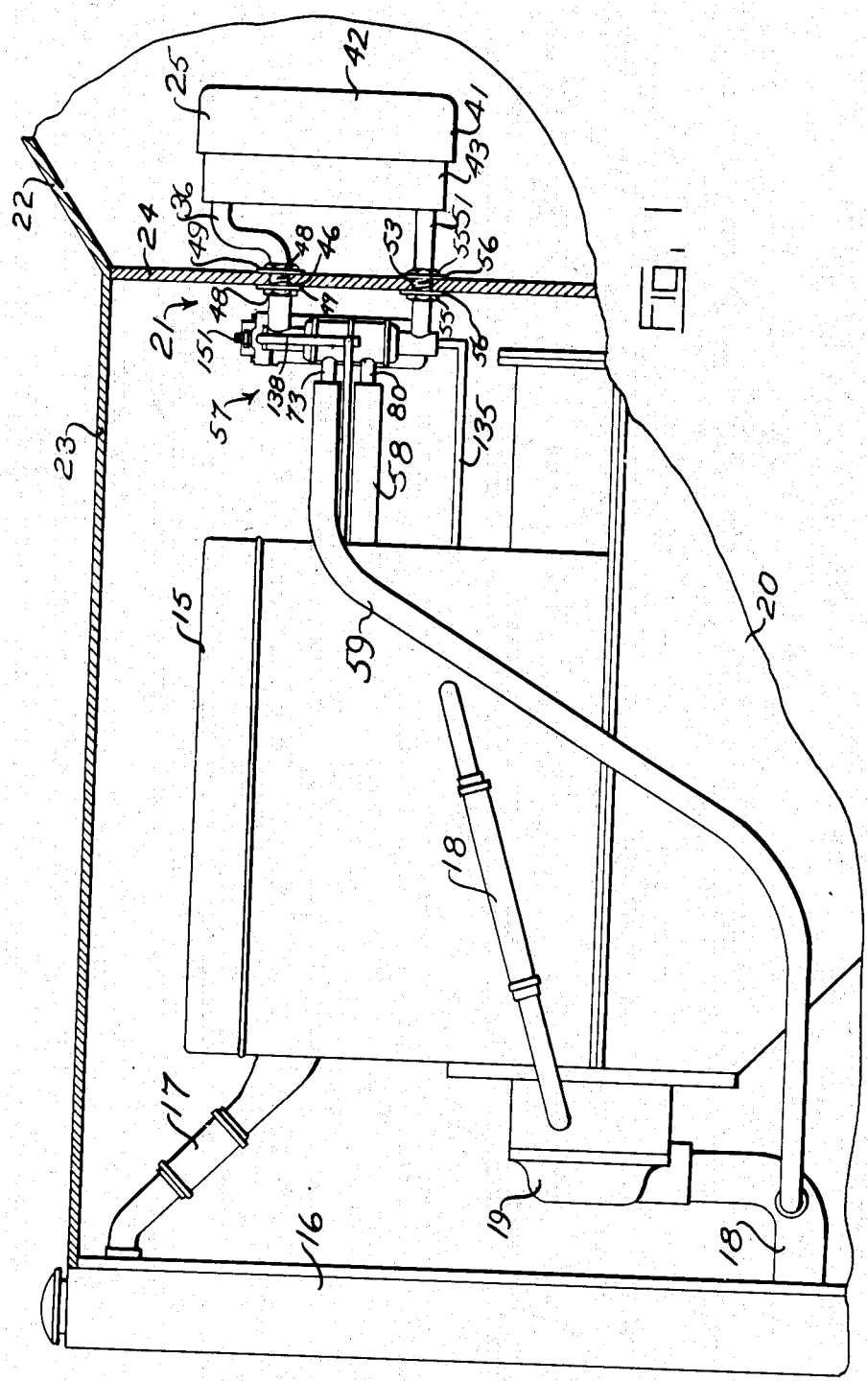

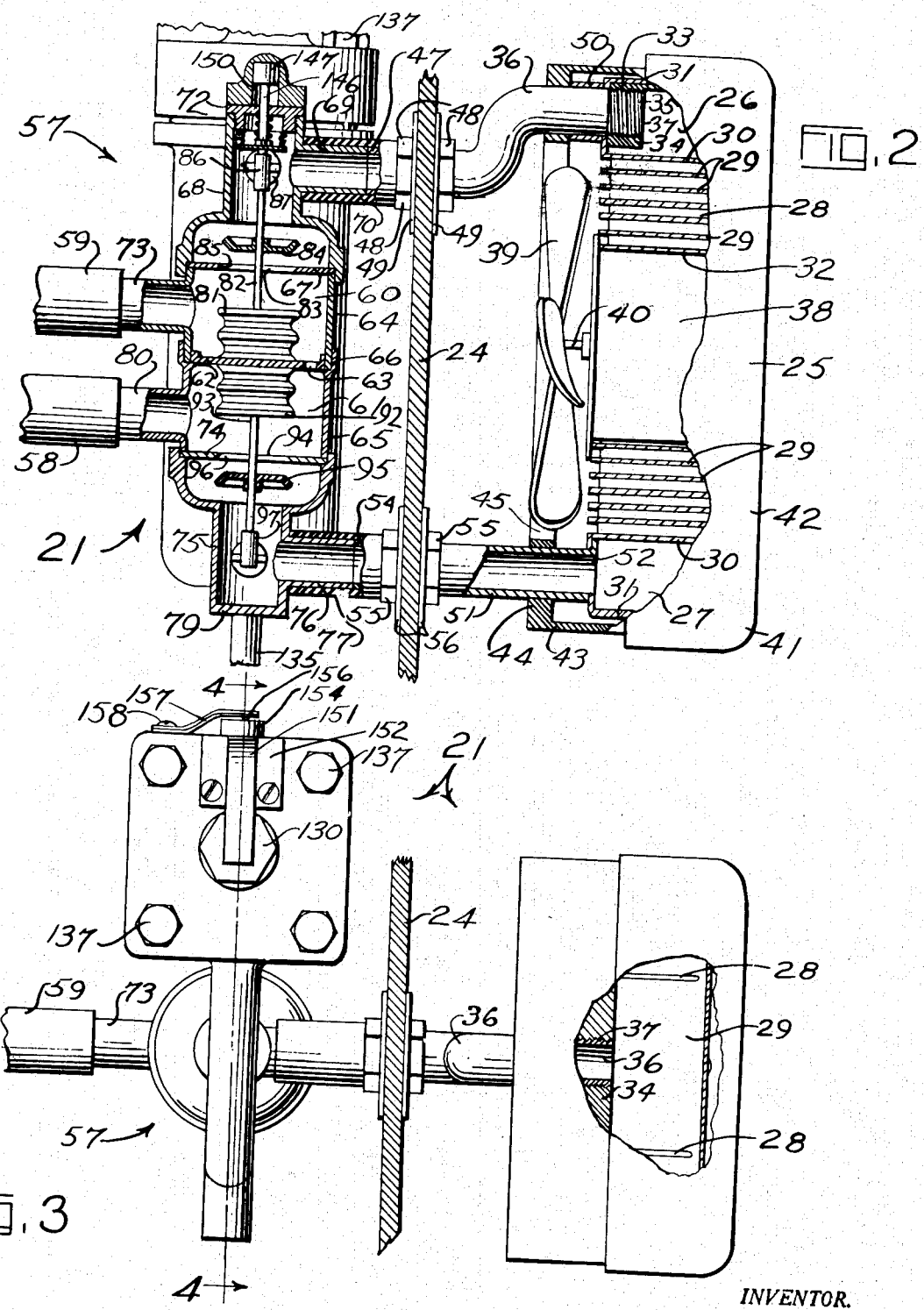

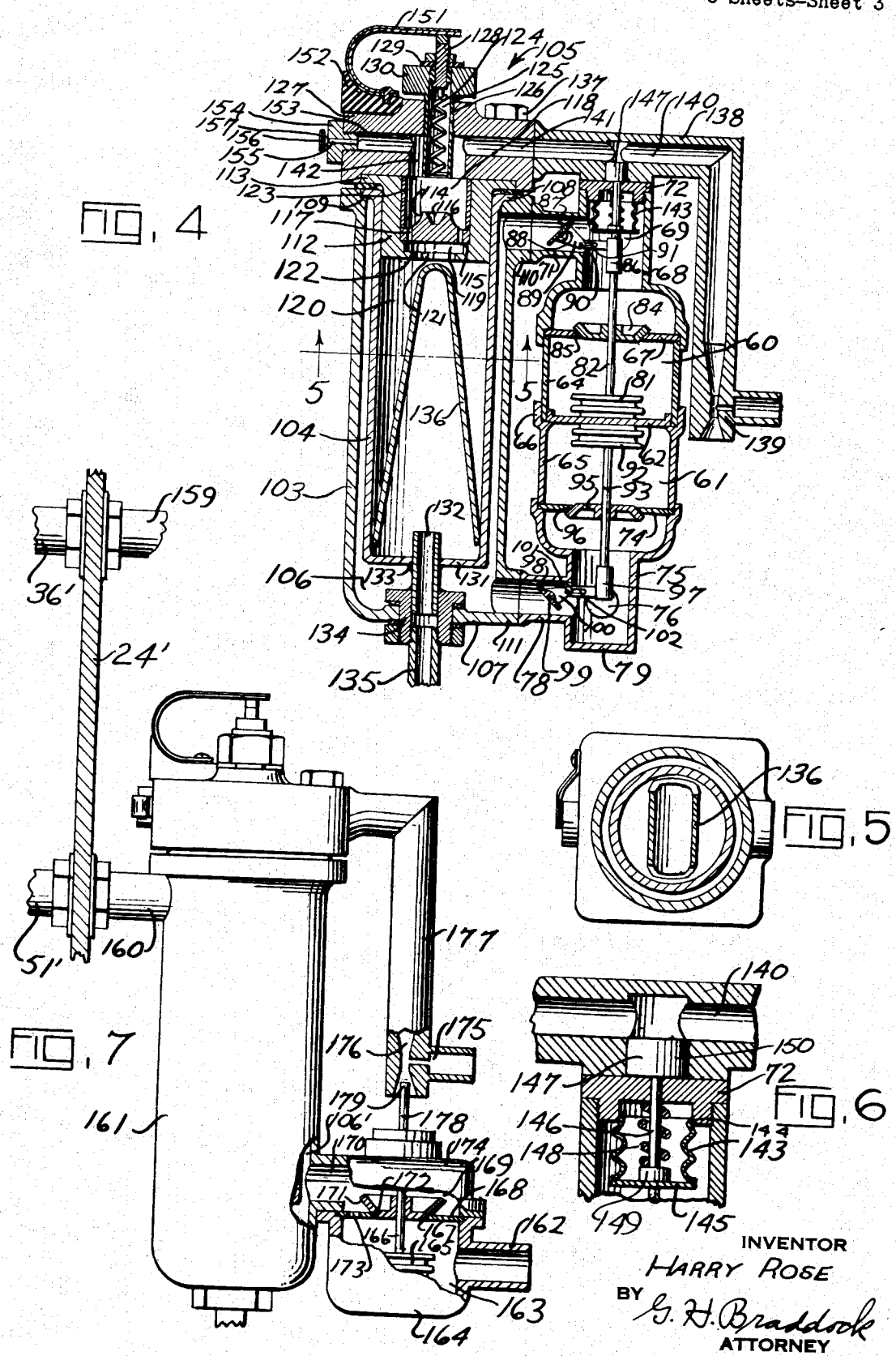

INVENTOR
HARRY ROSE
BY
G. H. Braddock
ATTORNEY

Oct. 27, 1942.   H. ROSE   2,300,011
HEATER
Filed June 12, 1939   5 Sheets-Sheet 5

INVENTOR
HARRY ROSE
BY
G. H. Braddock
ATTORNEY

Patented Oct. 27, 1942

2,300,011

UNITED STATES PATENT OFFICE 2,300,011

HEATER

Harry Rose, Wyandotte, Mich.

Application June 12, 1939, Serial No. 278,704

26 Claims. (Cl. 237—8)

The present invention relates to a heater, and has more especial reference to a heating apparatus for warming the interior space of an automotive vehicle body, such, for example, as a pleasure vehicle, taxicab, bus, or truck.

This application contains claims common to the subject matter of this application and my co-pending application Serial No. 229,540, filed September 12, 1938.

An object of my invention is to provide an automotive vehicle heating apparatus which will include a construction and arrangement for diverting fluid-cooling or circulating medium from the cooling or circulating system of the internal combustion engine of the vehicle and utilizing the diverted fluid-cooling or circulating medium to warm the passenger compartment of the vehicle and wherein provision is made to impart under some conditions additional heat to the diverted fluid-cooling or circulating medium.

Another object of my invention is to provide an automotive vehicle heating apparatus as hereinabove generally described and which includes a new and improved fuel burner for heating the fluid-cooling or circulating medium.

Another object of my invention is to provide an automotive vehicle heating apparatus as hereinabove generally described and which includes a new and improved regulating mechanism for controlling the flow of fluid-cooling or circulating medium to a heater located in the passenger compartment of the vehicle and for controlling the addition of heat to such medium by means other than the internal combustion engine of the vehicle.

Another object of my invention is to provide an automotive vehicle heating apparatus as hereinabove generally described and which includes a new and improved valve mechanism for controlling the flow of fluid-cooling or circulating medium.

Another object of my invention is to provide an automotive vehicle heating apparatus as hereinabove generally described and which includes a new and improved thermostatic control for operating the valve mechanism which regulates the flow of fluid-cooling or circulating medium.

Another object of my invention is to provide an automotive vehicle heating apparatus as hereinabove generally described and which includes a new and improved heater for the passenger compartment.

A further object is to provide a heating apparatus wherein will be incorporated various improved features and characteristics of construction novel both as individual entities of the heating apparatus and in combination with each other.

And a further object is to provide a fuel or fluid fuel or gasoline heated fluid medium heating apparatus, useful for a variety of purposes and especially useful to the purpose of warming the interior space of an automotive vehicle, which will be of novel and improved construction and can be employed as an independent entity or unit for warming or heating purposes, either in connection with the cooling or circulating system of an internal combustion engine, or otherwise.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a heating apparatus having features and characteristics of the invention incorporated therein, disclosing said heating apparatus as when applied to an automotive vehicle;

Fig. 2 is an enlarged vertical sectional view, partially in elevation and partially broken away, of the heating apparatus of Fig. 1;

Fig. 3 is a top plan view, partially in section and partially broken away, of the heating apparatus of Fig. 2;

Fig. 4 is a vertical sectional view, taken on line 4—4 in Fig. 3;

Fig. 5 is a detail sectional view, taken as on line 5—5 in Fig. 4;

Fig. 6 is an enlarged fragmentary sectional view detailing elements disclosed in Fig. 4;

Fig. 7 is a side elevational view, partially in section and partially broken away, of a heating apparatus of modified construction made according to the invention;

Figure 8:
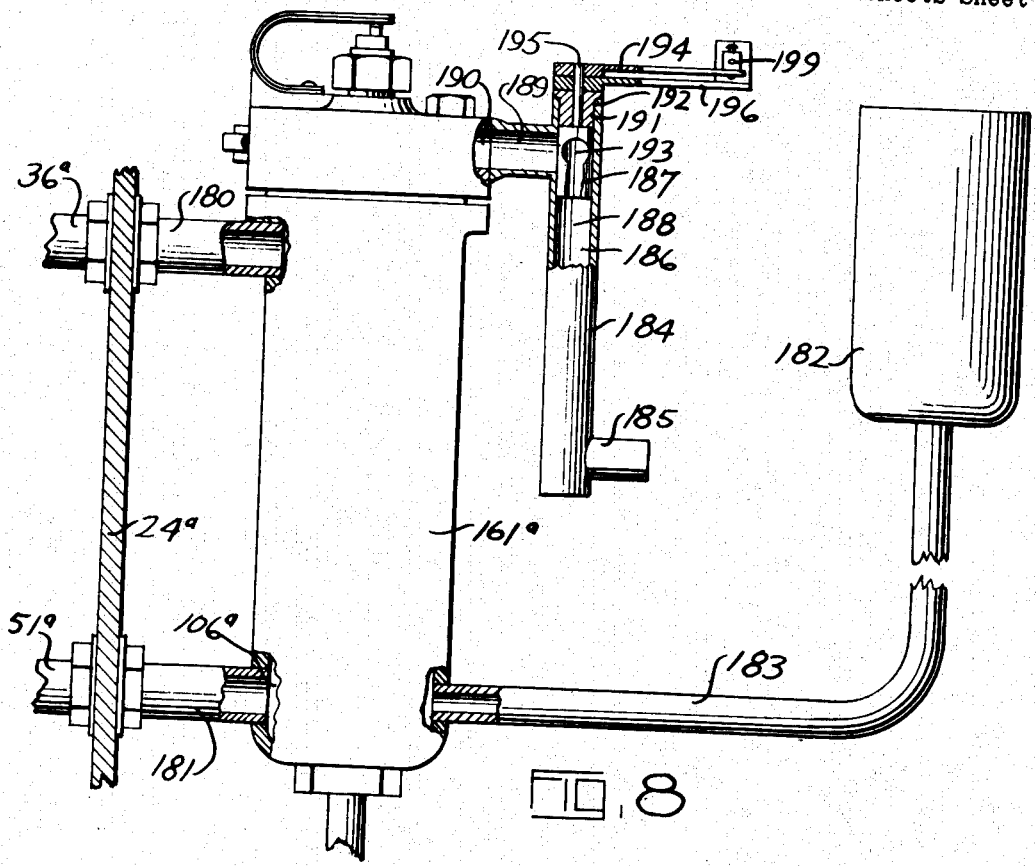
Fig. 8 is a side elevational view, partially in section and partially broken away, of a heating apparatus of further modified construction made according to the invention.

With respect to Figs. 1 to 6 of the drawings and the numerals of reference thereon, 15 denotes the engine jacket, 16 the fluid cooling radiator, 17 the fluid connection from the jacket 15 to the radiator, 18 the fluid connection from said radiator to said jacket, and 19 represents, generally, the usual pump for the fluid-cooling or circulating medium of an automotive vehicle 20 of any ordinary or preferred character, such as a pleasure vehicle, taxicab, bus, or truck. Ordinarily, the fluid-cooling or circulating medium is circulated by the pump 19 from the jacket 15 through the connection 17 to the radiator 16 and back to the jacket from the radiator through the connection 18.

In Figs. 1, 2 and 3 of the drawings, the novel and improved heating apparatus, designated 21, is mounted partially within the body 22 of the automotive vehicle 20 and partially beneath the hood 23 of said automotive vehicle, numeral 24 indicating the dash of the vehicle upon which the heating apparatus is supported in a manner to be set forth. As also to be made clear, suitable fluid conveying connections are provided whereby a part or all of the fluid-cooling or circulating medium of the internal combustion engine of said vehicle is diverted and utilized as heated fluid medium for supplying heat to said heating apparatus.

The heating apparatus 21 includes a heating unit 25 situated within the vehicle body 22, and said heating unit 25 includes a fluid-heated, air-heating core consisting of an upper fluid tank 26, a lower fluid tank 27, a plurality of spaced apart fluid conveying tubes, each denoted 28, extending between said tanks 26 and 27, and fins, each indicated 29, in spaced relation upon said tubes 28 and extending transversely thereof. The fluid conveying tubes 28 are arranged in two spaced apart banks or sets of tubes. As disclosed, each tube 28 is relatively flat and wide, said tubes desirably being of width slightly less than that of the tanks 26 and 27. Said tanks desirably are of equal length and width. Outermost tubes 28 of the different banks or sets of tubes will be arranged adjacent the opposite end portions of the tanks and all of said tubes will be parallelly arranged.

Each of the fluid tanks 26 and 27 desirably may consist of a header plate 30 into which the adjacent ends of the tubes 28 are suitably fastened in fluid-tight fashion, as by soldering or otherwise, and a housing member 31 suitably fastened, also in fluid-tight fashion, as by soldering or otherwise, to the marginal portions of the corresponding header plate 30.

The fins 29 desirably are of relatively small thickness and of width slightly greater than the width of the tubes, which may be of equal width. The construction will include longer fins adjacent the outer end portions of the core of the heating unit 25 and shorter fins between the two sets of longer fins. The longer fins will be of length about equal to the length of each tank 26, 27, and each shorter fin will be arranged upon the tubes 28 of but a single bank or set of tubes. The forward and rearward edges, respectively, of the fins desirably terminate in a single plane, as do also the outer edges, respectively, of said fins. The inner edges of the shorter fins, between the two sets of longer fins, terminate at about the location of the innermost tubes 28, 28 of the different banks or sets of tubes. The innermost fins of the two sets of longer fins are in spaced relation to each other, and thus a rectangular space, represented 32, in the core and between the banks or sets of tubes and surrounded by the longer and shorter fins is provided, for a purpose to be made clear.

The tubes 28 of the different banks or sets of tubes desirably are spaced at equal distances from each other, and each of said tubes desirably is perpendicular to each header plate 30, with the widths of the tubes preferably disposed perpendicularly to a plane extending longitudinally and perpendicularly through both header plates.

The fins 29, including both the longer and shorter fins, desirably are likewise spaced at equal distances from each other, with the uppermost and lowermost fins desirably being spaced at this same distance from the header plates 30, as best disclosed in Fig. 2. Said fins 29 may be associated with the tubes 28, before said tubes are secured to the header plates 30, by providing openings through the fins of size to fit the tubes and sliding the fins over said tubes, or sliding the tubes through the openings in the fins. Preferably, the fins are secured to the tubes, as by soldering or otherwise, to be in intimate heat conveying contact therewith.

When a core constructed as described is completed, it comprises a generally rectilinear article, said article having the opposite end portions thereof, constituted by the housing members 31 of the tanks 26 and 27, constructed along somewhat curvilinear lines.

A supporting structure for the heating unit is adapted to be assembled with tubular or pipe supports or connections for said heating unit. The fluid tank 26 conveniently carries at the interior thereof a suitable bracket 33, said bracket being suitably secured to the upper wall of the upper housing member 31. A downwardly extending flange 34 of the bracket 33 includes a tapped hole 35 adjacent the rearward wall of said upper housing member. A tubular or pipe support or connection 36 has a threaded end portion 37 turned into the tapped hole 35, as disclosed very clearly in Fig. 2. The tubular or pipe support or connection 36 extends through an opening in the rearward wall of the upper housing member, and a fluid-tight seal is provided between said opening and said tubular pipe support or connection, as by soldering or otherwise. The bracket 33 desirably is constructed so as to spread over a considerable area on the inside of the housing member of the upper tank 26, to provide a relatively wide supporting surface for the heating unit 25. Also, the bracket 33 and the tubular or pipe support or connection 36 are of quite rigid structure, and when said tubular or pipe support or connection is rigidly secured in the rearward wall of the upper housing member 31, as by soldering or otherwise, said tubular or pipe support or connection is obviously fixed against turning movement in the bracket 33.

Numeral 38 denotes an electric motor within the space 32 of the heating core of the heating unit, and said electric motor has a blower or fan 39 fixed upon the motor shaft 40. The electri motor 38 is of dimensions to nicely fit into the space 32, and the arrangement is such that the blower or fan 39 will be situated adjacent the core in fairly close relation thereto, about as illustrated in Fig. 2. When electric power is applied from a source (not shown), such as the battery of an automotive vehicle, to the motor 38, the blower or fan 39 is driven to force air through the core, past and over the tubes and fins thereof. The electric motor can be secured in and to the core of the heating unit 25 in any suitable and convenient manner.

A usual casing 41 is adapted to contain the assembly of the core, motor and blower or fan. As illustrated, the casing is a box-like member consisting of a forward shell 42 and a rearward shell 43, which shells may have a telescoping fit and be secured in fixed relation to each other in any convenient manner. The forward shell 42 of course will include an open front for the heating unit, and said open front may include a grill or air deflector of any suitable construction and design. The shells 42 and 43 together constitute a casing including straight side walls, curvilinear upper and lower end walls, and a front wall perpendicular to said side and end walls of the casing, said front wall being cut away or open, as before stated. The cut-away or open portion of the front wall of the core casing desirably may be of area about equal to, or a little less than, and approximately similar to, the overall area covered by the forward surfaces or edges of the fins 29. The back of the casing 41, constituted by the rearward shell 43, includes a flange 44 parallel with the front wall of said casing, said flange 44, together with the adjacent portions of said rearward shell 43, constituting a shroud for the blower or fan including a circular opening 45 in spaced relation thereto. The core is inserted in the casing 41 so that said core is situated centrally of the cut-away portion or opening in the front wall of said casing desirably to completely cover said cut-away portion or opening.

The tubular or pipe support or connection 36 constitutes a portion of means through the instrumentality of which the heating unit 25 can be mounted upon a fixed part of the automotive vehicle body 22. As disclosed very clearly in Figs. 1, 2 and 3, the outer portion 46 of the tubular or pipe support 36 is externally threaded and passes through a hole in the dash 24 of the automotive vehicle, said hole closely fitting upon said tubular or pipe support. An extension 47 upon said threaded portion 46 of the tubular or pipe support 36 is disposed beneath the hood 23, at the side of the dash 24 opposite the heating unit 25. Said tubular or pipe support is rigidly secured in the dash of the automotive vehicle by adjustable supporting nuts 48 upon the tubular or pipe support, there being a nut 48 at each side of the dash, each of which nuts can be turned up against a washer 49 between the nut and the dash. The tubular or pipe support 36 passes through an opening in the flange 44, and a spacing sleeve 50 upon said tubular or pipe support 36 has one of its ends engaging the rearward surface of the upper housing member 31 of the core and its other end engaging said flange 44. It will be evident that the supporting nuts 48 can be adjusted to situate the tubular or pipe support 36 in the vehicle dash 24 so that the casing 41 has any desired relation to said dash 24, closer to or farther from said dash.

Numeral 51 denotes a tubular or pipe support or connection adapted to cooperate with the tubular or pipe support or connection 36 to the purpose of mounting the heating unit 25 upon the dash 24. Said tubular or pipe support or connection 51 passes through an opening in the flange 44 and is suitably and conveniently secured, as at 52, upon the rearward wall of the lower housing member 31. The outer portion 53 of the tubular or pipe support 51 is externally threaded and passes through a hole in the dash 24 of the automotive vehicle, said hole closely fitting upon said tubular or pipe support. An extension 54 upon said threaded outer portion 53 of the tubular or pipe support 51 is disposed beneath the hood 23, at the side of the dash 24 opposite the heating unit 25. Said tubular or pipe support 51 is rigidly secured in the dash of the automotive vehicle by adjustable supporting nuts 55 upon the tubular or pipe support 51, there being a nut 55 at each side of the dash, each of which nuts can be turned up against a washer 56 between the nut and the dash.

The weight of the casing assembly, including the electric motor and blower or fan, the grill or deflector and the shroud, is made rigid with the core of the heating unit 25, which carries said weight back to the tubular or pipe supports 36 and 51.

A hot fluid heater of commerce constructed as hereinbefore described additionally includes a fluid connection extending from the engine jacket 15 to the tube or pipe 51 and a fluid connection extending from the tube or pipe 36 to the connection 18. However, in the construction disclosed in Figs. 1 to 6 of the drawings, the fluid connections from said engine jacket 15 to said tube or pipe 51 and from said tube or pipe 36 to said connection 18 are by way of a mechanism 57 of structure and for purposes to be described. As shown, a fluid pipe 58 constitutes a connection between the engine jacket 15 and the mechanism 57, and said mechanism is connected to the tube or pipe 51 to be capable of communicating therewith at a side of the mechanism opposite said fluid pipe 58, and a fluid pipe 59 constitutes a connection between said mechanism 57 and the connection 18 and the tube or pipe 36 is connected to the mechanism to be capable of communicating therewith at a side of said mechanism opposite said fluid pipe 59.

Were the novel and improved mechanism 57 omitted from the heating apparatus, and, instead, the fluid pipe 58 directly connected to the tube or pipe 51 in communicating relation therewith and the tube or pipe 36 directly connected to the fluid pipe 59 in communicating relation therewith, said heating apparatus would be operative in the manner as follows. Assuming the internal combustion engine of the automotive vehicle 20 to be in operation, there would be a substantial flow of heated fluid from the jacket 15 through the fluid pipe 58 and the tube or pipe 51 to the core of the heating unit 25 and back to said jacket 15 through the tube or pipe 36, the fluid pipe 59 and the connection 18. Any other suitable and preferred arrangement for circulating all or any desired portion of the heated fluid of the engine cooling system through the core of the heating unit 25 of course can be substituted for the arrangement disclosed. As illustrated, the flow of heated fluid from and back to the engine jacket is upward through the heating unit core. The flow from and back to the engine jacket could of course be downward through the core of the heating unit, the heated fluid in such an event passing through a suitable connection attached to the tube or pipe 36 to here enter the core and leaving said core by way of the tube or pipe 51 and a suitable connection attached thereto. The heated fluid upon entering the tube or pipe 51 passes into the lower tank 27. Thence heated fluid passes upwardly through each of the relatively flat and wide tubes 28 to the upper tank 26. And from said tank 26 the heated fluid passes out of the heating unit 25 through the tube or pipe 36. While traveling through the tubes 28, the heated fluid gives off heat which is absorbed by the fins 29, and, by rotation of the blower or fan 39 to force air past and over the tubes and fins, the air is caused to be heated and distributed throughout the vehicle body.

The mechanism 57 by way of which the engine jacket 15 and the fluid pipe 58 are connected to the tube or pipe 51 and the tube or pipe 36 is connected to the fluid pipe 59 itself attached to the connection 18 is disclosed in Figs. 1, 2 and 3 as situated beneath the hood 23, supported by the extensions 47 and 54 of the tubular or pipe supports 36 and 51, respectively. A purpose of said mechanism 57 is to provide or supply heated fluid medium for the heating unit 25 and to cause the provided or supplied heated fluid medium to be fed to said heating unit independently of the cooling or circulating system as such of the internal combustion engine of the automotive vehicle 20, and a further purpose of the mechanism 57 is to render said internal combustion engine cooling or circulating system as such incapable of forcing or feeding heated fluid medium to the heating unit 25 while said mechanism is causing heated fluid medium to be forced or fed to said heating unit, as well as to render the mechanism 57 itself incapable of causing heated fluid medium to be forced to the heating unit while this is being supplied or provided with heated fluid medium from the cooling or circulating system of the internal combustion engine of said automotive vehicle 20.

The mechanism 57 includes a pair of control chambers constituted as an upper control chamber 60 and a lower control chamber 61. A horizontal partition 62 between the control chambers 60 and 61 separates said control chambers from each other, and a small opening 63 through said partition 62 affords limited communication between the control chambers 60 and 61 to a purpose to be made clear. The control chambers 60 and 61 are provided by an upper and a lower bellows housing, denoted 64 and 65, respectively, and said bellows housings 64 and 65 are secured to each other as at 66. Said horizontal partition 62 is secured between the bellows housings 64 and 65 in any suitable and convenient manner.

The upper bellows housing 64 includes a horizontal partition 67 in spaced relation to and above the horizontal partition 62 and an upwardly extending neck 68 at the upper portion of said upper bellows housing 64, which neck 68 is adapted to communicate with an integral, hollow, horizontal boss or protuberance 69 alined with the extension 47 of the tubular or pipe support 36 and rigidly secured to the extension 47 in communicating relation therewith by a tubular element 70 in surrounding relation to both said boss or protuberance 69 and said extension 47. That is, the tubular element 70 rigidly secures the upper bellows housing 64 to the extension 47 and thus mounts the mechanism 57 upon the tubular or pipe support 36, and said tubular element 70 is of construction and is composed of material to constitute a fluid seal between said extension 47 and said boss or protuberance 69. Said neck 68 is also joined with a second integral, hollow, horizontal boss or protuberance 71 at the elevation of the boss or protuberance 69 and disposed substantially ninety degrees from said boss or protuberance 69 in the disclosure as made. The bosses or protuberances 69 and 71 are adapted to communicate with each other by way of said hollow neck 68. The upper end of the hollow neck 68, directly above the bosses or protuberances 69 and 71, is closed by a horizontal piece 72. Stated differently, the hollow neck 68 is open at its lower portion to the upper control chamber 60 and includes the hollow bosses or protuberances 69 and 71 at its upper portion, but otherwise said hollow neck 68 is closed. The fluid connection 59 is connected to a hollow boss or protuberance 73 upon and integral with the upper bellows housing 64, below the horizontal partition 67, in communicating relation to the upper control chamber 60.

The lower bellows housing 65 includes a horizontal partition 74 in spaced relation to and below the horizontal partition 62 and a downwardly extending hollow neck 75 at the lower portion of said lower bellows housing 65, which neck 75 is adapted to communicate with an integral, hollow, horizontal boss or protuberance 76 alined with the extension 54 of the tubular or pipe support 51 and rigidly secured to the extension 54 in communicating relation therewith by a tubular element 77 in surrounding relation to both said boss or protuberance 76 and said extension 54. That is, the tubular element 77 rigidly secures the lower bellows housing 65 to the extension 54 and thus mounts the mechanism 57 upon the tubular or pipe support 51, and said tubular element 77 is of construction and is composed of material to constitute a fluid seal between said extension 54 and said boss or protuberance 76. Said neck 75 is also joined with a second, integral, hollow, horizontal boss or protuberance 78 at the elevation of the boss or protuberance 76 and disposed substantially ninety degrees from said boss or protuberance 76 in the disclosure as made. The bosses or protuberances 76 and 78 are adapted to communicate with each other by way of said hollow neck 75. The lower end of said neck 75, directly below the bosses or protuberances 76 and 78, is closed by a horizontal piece 79. Stated differently, the hollow neck is open at its upper portion to the lower control chamber 61 and includes the hollow bosses or protuberances 76 and 78 at its lower portion, but otherwise said hollow neck 75 is closed. The fluid connection 58 is connected to a hollow boss or protuberance 80 upon and integral with the lower bellows housing 65, above the horizontal partition 74, in communicating relation to the lower control chamber 61.

The horizontal partition 62 fixedly supports the lower portion of an upper control bellows 81 which is situated in the upper control chamber 60 below the horizontal partition 67 in spaced relation to said partition 67 and the upper bellows housing 64 and extends upwardly from said partition 62. The upper end of the upper control bellows 81 is closed and fixedly supports an upper valve stem and control plunger 82 which extends upwardly through an opening 83 in the horizontal partition 67 and through the hollow neck 68 in spaced relation to said neck. An intermediate portion of the upper valve stem and control plunger 82 fixedly carries a disc valve 84 adapted to close the opening 83 in the partition 67 by engagement with a valve seat 85 surrounding and provided by said opening 83. The disc valve 84 is disposed above said partition 67. An upper portion of said upper valve stem and control plunger 82 fixedly carries an actuator element 86 for a butterfly valve 87 within the boss or protuberance 71 and adapted to shut off communication by way of said neck 68 between the boss or protuberance 69 and a boiler, presently to be described, with which said boss or protuberance 71 communicates. When the upper control bellows 81 is expanded, as in Fig. 2, the disc valve 84 is in open position and the butterfly valve 87 is in closed position, and when said upper control bellows 81 is contracted, as in Fig. 4, said disc valve 84 is in closed position and said butterfly valve 87 is in open position. The butterfly valve 87 is rotatably supported, as at 88, in the boss or protuberance 71 and includes a manipulating lever 89 therefor which is operatively assembled with the actuator element 86 through the instrumentality of a pin 90 carried by said manipulating lever 89 and disposed in an elongated slot 91 in said actuator element 86.

The horizontal partition 62 also fixedly supports the upper portion of a lower control bellows 92 which is situated in the lower control chamber 61 above the horizontal partition 74 in spaced relation to said partition 74 and the lower bellows housing 65 and extends downwardly from said partition 62. The lower end of the lower control bellows 92 is closed and fixedly supports a lower valve stem 93 which extends downwardly through an opening 94 in the horizontal partition 74 and through the hollow neck 75 in spaced relation to said neck. An intermediate portion of the lower valve stem 93 carries a disc valve 95 adapted to close the opening 94 in the partition 74 by engagement with a valve seat 96 surrounding and provided by said opening 94. The disc valve 95 is disposed below said partition 74. A lower portion of said lower valve stem 93 fixedly carries an actuator element 97 for a butterfly valve 98 within the boss or protuberance 78 and adapted to shut off communication by way of said neck 75 between the boss or protuberance 76 and the before mentioned boiler with which said boss or protuberance 78 communicates. When the lower control bellows 92 is expended, as in Fig. 2, the disc valve 95 is in open position and the butterfly valve 98 is in closed position, and when said lower control bellows 92 is contracted, as in Fig. 4, said disc valve 95 is in closed position and said butterfly valve 98 is in open position. The butterfly valve 98 is rotatably supported, as at 99, in the boss or protuberance 78 and includes a manipulating lever 100 therefor which is operatively assembled with the actuator element 97 through the instrumentality of a pin 101 carried by said manipulating lever 100 and disposed in an elongated slot 102 in said actuator element 97.

It will be obvious that when the control bellows 81 and 92 are situated as in Fig. 2, there will be a communicating connection by way of the lower bellows housing 65 between the fluid pipe 58 and the tube or pipe 51, as well as a communicating connection by way of the upper bellows housing 64 between the tube or pipe 36 and the fluid pipe 59. It also will be obvious that when the control bellows 81 and 92 are situated as in Fig. 4, there will be a communicating connection by way of the hollow neck 68 between the boiler from which the boss or protuberance 71 leads and the boss or protuberance 69 leading to the tube or pipe 36, as well as a communicating connection by way of the hollow neck 75 between the boss or protuberance 76 leading from the tube or pipe 51 and said boiler to which the boss or protuberance 78 leads.

The heating apparatus incorporates a fuel or fluid fuel heating device which in the disclosure as made is associated or assembled with the bosses or protuberances 71 and 78 upon the upper and lower hollow necks 68 and 75, respectively. Said heating device includes a boiler consisting of an outer boiler shell 103 and an inner boiler core 104, and also includes a burner 105 for causing the boiler to be heated.

The outer boiler shell 103 and the inner boiler core 104 provides a fluid chamber 106 of the boiler between said boiler shell and boiler core. The lower end of the fluid chamber 106 is closed by a wall 107 of the outer boiler shell 103, and the upper end of said fluid chamber 106 is closed by an annular outwardly extending flange 108 upon the upper end of the inner boiler core 104 seated against an annular shoulder 109 provided at the upper end of the outer boiler shell 103. Said outer boiler shell 103 and inner boiler core 104 are rigidly assembled together.

An upper portion of the fluid chamber 106 communicates with a hollow, horizontal boss or protuberance 110 which is integral with the outer boiler shell 103 and is situated directly below the annular shoulder 109, in alining relation with the boss or protuberance 71. As disclosed, said bosses or protuberances 71 and 110 are rigidly secured together in communicating, fluid-tight relation to each other. Any suitable and convenient means can be employed to this purpose. A lower portion of the fluid chamber 106 communicates with a hollow, horizontal boss or protuberance 111 which is integral with the outer boiler shell 103 and is situated just above the wall 107 of the outer boiler shell, in alining relation with the boss or protuberance 78. The bosses or protuberances 78 and 111 also are rigidly secured together in communicating, fluid-tight relation to each other by employment of any suitable and convenient means. Thus, the boiler, with appurtenances, is fixedly supported upon the bellows housings 64 and 65, which are, in turn, rigidly secured to each other, and rigidly mounted upon the tubular or pipe supports 36 and 51.

The fluid chamber 106 provided by the outer boiler shell 103 and the inner boiler core 104 is in surrounding relation to said inner boiler core.

As disclosed, the burner 105 includes an igniter case 112 rigidly and tightly seated in the open upper end of the inner boiler core 104. Said igniter case 112 includes an annular outwardly extending flange 113 at its upper end seated in fluid-tight manner against the annular outwardly extending flange 108. A re-igniter 114, desirably of ceramic like material, is seated in a lower portion of the igniter case 112 against an annular shoulder 115 of said igniter case. In the disclosure as made, the re-igniter 114 includes a concavity 116 in its upper surface, and apertures 117 extend through the body of said igniter. The apertures 117 are in communicating relation at their upper ends with a chamber 118 of the igniter case 112 above the re-igniter 114 and at their lower ends with a smaller chamber 119 below said re-igniter. The smaller chamber 119 is open to the interior 120 of the inner boiler core 104 by way of a passage 121 in the lower wall 122 of the igniter case. A sleeve 123 is disposed rigidly in the chamber 118 against its side wall, and the lower end of said sleeve 123 engages a marginal portion of the re-igniter 114 and retains said re-igniter against the annular shoulder 115. The apertures 117 are disposed between the concavity 116 and the sleeve 123.

The burner 105 also includes a resistance element 124 situated in a way 125 directly above the chamber 118 provided by a tube 126 supported by a frame 127. The upper end of the resistance element 124 is anchored in a conducting element 128 itself insulatively fixed, as at 129, in an enlarged portion 130 of the tube 126 at the upper end of said tube, and the lower end of said resistance element is attached to the tube 126. The conducting element 128 extends to position above the enlarged portion 130 of said tube 126, and the upper portion of the tube is closed in fluid-tight manner at the location where said conducting element is fixed in the tube.

The inner boiler core 104 includes a lower closure wall 131 in spaced relation to the lower closure wall 107 of the outer boiler shell 103, and a tubular connector 132 extends between the walls 131 and 107. The tubular connector 132 is hollow, is disposed substantially centrally of the lower closure wall 131, and is composed of material adapted readily to expand and contract without breaking. Said tubular connector 132 is soldered or welded, as at 133, in the lower closure wall 131, and is secured to the lower closure wall 107 through the instrumentality of a fitting 134. The construction and arrangement is such that the joints between the tubular connector 132 and the walls 131 and 107 are fluid-tight. An outlet pipe 135 is suitably and conveniently secured to the fitting 134, and the interior 120 of the inner boiler core 104 is in communicating relation to said outlet pipe 135 by way of the hollow tubular connector 132. The outlet pipe 135 constitutes an exhaust passageway leading from the burner and extends to the intake manifold of the internal combustion engine of the automotive vehicle 20, as will be clear from Fig. 1.

A generally V-shape baffle 136 is suitably and conveniently situated within the interior 120 of the inner boiler core 104 with its base situated below and adjacent the passage 121 and its divergent legs at either side of the hollow tubular connector 132. The outer surfaces of the V-shape baffle 136 are in spaced relation to the side wall of the inner boiler core 104, as are also the opposite side edges of said V-shape baffle, and the ends of the legs of the baffle, spaced from the base, terminate at location which is adjacent the lower closure wall 131. See Figs. 4 and 5.

The frame 127 is disclosed fastened down against the igniter case 112 by screw bolts 137 and is rigid with the remainder of the heater and burner. An inlet pipe 138 leading into the chamber 118 is adapted to extend from a carburetor 139 for causing fluid fuel, such as gasoline mixed with air, to be drawn or fed into said chamber 118 in response to suction created in the intake manifold of the internal combustion engine of the automotive vehicle 20. The inlet pipe 138 is supported upon the horizontal piece 72 and is rigidly secured to the frame 127. An inlet passageway 140 through said inlet pipe 138 communicates with a passage 141 in the frame 127 which leads to an annular space 142 within said frame surrounding the lower portion of the tube 126 and contiguous with the upper end of the chamber 118. The annular space 142, the chamber 118, the chamber 118 and the interior 120 of the inner boiler core 104 may be termed the combustion chamber of the burner.

The inlet passageway 140 through the inlet pipe 138 extends across a path which is directly above the upper valve stem and control plunger 82. The horizontal piece 72 constitutes the base of a device for allowing and shutting off flow of combustible fuel from the carburetor 139 through said passageway 140 of the inlet pipe 138 to the combustion chamber of the burner. Said device also constitutes a seal for precluding the passage of fluid out of the upper control chamber 60 by way of said horizontal piece 72. A bellows 143 is secured at 144 to a lower portion of the horizontal piece 72 to extend downwardly therefrom, and the base 145 of said bellows 143 rigidly supports a shut-off rod 146 which extends upwardly through the bellows in alining relation to the upper valve stem and control plunger 82, as well as upwardly through an opening in the horizontal piece 72. Said shut-off rod 146 is suitably arranged in the horizontal piece 72 to be snugly slidable therein and is as disclosed disposed axially of the bellows 143 in spaced relation to its side wall. A shut-off valve 147 is rigidly carried by the upper end of the shut-off rod 146 and is situated in the inlet pipe 138. A coil spring 148 arranged upon the shut-off rod 146 has its upper end engaged with the horizontal piece 72 and its lower end engaged with an enlargement 149 of said shut-off rod adjacent the base 145 of the bellows normally to retain the shut-off valve 147 in a channel 150 of the inlet pipe 138 at one side of its inlet passageway 140. Said coil spring 148 also retains the base 145 of the bellows 143 in engagement with the upper end of the upper valve stem and control plunger 82 when the upper bellows 81 is contracted, as in Figs. 4 and 6. The arrangement is such that when said upper control bellows 81 is expanded, said upper valve stem and control plunger 82 causes the shut-off rod 146 and the shut-off valve 147 to be elevated, against the action of the coil spring 148, so that said shut-off valve 147 is across the path of the inlet passageway 140, as in Fig. 2, to completely shut off communication between the carburetor 139 and the combustion chamber of the burner.

The resistance element 124 is adapted to be energized by electrical current from any suitable and convenient source (not shown). A circuit for said resistance element can include a bimetallic blade 151 insulatively supported, as at 152, upon the frame 127. The arrangement is such that the bimetallic blade 151 is engaged with the conducting element 128 when said bimetallic blade is not heated, and is removed from said conducting element when the bimetallic blade is heated. That is, the bimetallic blade 151 engages the conducting element 128 when the heater is at low temperature and becomes removed from said conducting element when said heater is at elevated temperature. In practice, the conducting element 128 and the bimetallic blade 151 become disengaged, to thus cause the resistance element 124 to become de-energized, when the heater has operated for a sufficient period of time to cause the re-igniter 114 to become hot enough to itself support combustion, as will be understood.

The annular space 132 is contiguous with a passageway 153 in the frame 127 situated directly opposite the passageway 141, in alining relation to said passageway 141 as shown. The end of the passageway 153 opposite the annular space 142 has therein a screw plug 154 situated at the outer side of the frame 127, and said screw plug 154 has a longitudinal port 155 therethrough adapted to be covered and uncovered by a ball valve 156 supported by a bimetallic arm 157 itself suitably and conveniently mounted, as at 158, upon the frame 127. The arrangement is such that the bimetallic arm 157 situates the ball valve 156 in engaging relation with the screw plug 154 to cause the longitudinal port 155 to be closed when said bimetallic arm is not heated and in spaced relation to said screw plug to cause said longitudinal port to be open when the bimetallic arm is heated. That is, the bimetallic arm 157 causes the longitudinal port 155 to be closed when the heater is at low temperature and to be open when said heater is at elevated temperature. In practice, the longitudinal port 155 is closed when the heater is started up, so that a relatively rich combustible fuel mixture will be fed to the combustion chamber of the heater for the commencement of ignition, and said longitudinal port 155 is open after the heater is put in operation, so that additional air providing a leaner combustible fuel mixture more suitable to operating conditions will be fed to the combustion chamber through the longitudinal port 155 and the passageway 153 after the heater has been started.

Assuming the parts of the heating apparatus to be situated as in Fig. 4, with the resistance element 124 energized and the internal combustion engine of the automotive vehicle 20 in operation, liquid fuel, say, for example, gasoline, mixed with air will be drawn or pulled or fed from the carburetor 139 into the combustion chamber of the heater through the inlet pipe 138 and the passageway 141, due to suction created in the intake manifold of said internal combustion engine. The combustible fuel mixture of course will be ignited by said resistance element 124 and caused to burn in said combustion chamber. The products of combustion, or hot gases, in passing through the interior 120 of the inner boiler core 104, about the baffle 136, will cause fluid in the boiler space or fluid chamber 106 to be heated. The products of combustion, when spent and comparatively cool, will pass to the intake manifold of the internal combustion engine. Evidently, hot fluid, whether liquid or gaseous, created in the fluid chamber 106 of the boiler will rise to the top or upper portion of said boiler and traverse the hollow bosses or protuberances 110 and 71, and hollow neck 68, the hollow boss or protuberance 69 and the tubular or pipe support 36 over to the heating unit 25. The hot fluid will enter the upper tank 26 of the core of said heating unit and will, naturally, pass downwardly into the tubes 28. Here the hot fluid, whether liquid or gaseous, will give up heat to said heating unit and its tubes 28 and fins 29 in the general manner as hereinbefore set forth in connection with the fluid-cooling or circulating medium from the internal combustion engine cooling or circulating system of the automotive vehicle 20. If hot fluid which enters the upper tank 26 of the heating unit core is steam, or gaseous, it will be condensed in said core and its tubes by the action of the blower or fan 39, as will be apparent. The hot fluid, while all the time imparting heat to the heating unit and its tubes and fins, will pass downwardly by gravity to the lower tank 27 of the core of said heating unit, and thence the hot fluid will travel by way of the tubular or pipe support 51, the hollow boss or protuberance 76, the hollow neck 75 and the hollow bosses or protuberances 78 and 111 back into the fluid chamber 106. As hereinbefore mentioned, the resistance element 124 is energized during the starting period of the burner, and is thereafter de-energized. Upon de-energization of said resistance element 124 combustion is sustained, so long as the feed of combustible fuel mixture to the combustion chamber is continued, by the re-igniter 114. Also, the ball valve 156 is in closing relation to the longitudinal port 155 during the starting period of the burner, and is then moved to open position of said longitudinal port to thus permit added air for combustion purposes to enter the combustion chamber, as above briefly stated.

When the fluid-cooling or circulating medium of the cooling or circulating system of the internal combustion engine of the automotive vehicle 20 is below a set and predetermined temperature at or above which said fluid-cooling or circulating medium should be to properly heat the interior space of the body 22 of the automotive vehicle, the control bellows 81 and 92 will be contracted, and the upper valve stem and control plunger 82 will be positioned to situate the valve 147 as in Figs. 4 and 6, out of the inlet passageway 140 through the inlet pipe 138. Supposing the internal combustion engine of the automotive vehicle 20 to be started up cold with the parts of the heating apparatus positioned as in said Fig. 4, the resistance element 124 being energized, the course of the fluid-cooling or circulating medium of the cooling or circulating system of the internal combustion engine from the jacket 15 to the heating apparatus and back to the jacket will be through the fluid pipe 58 to the lower control chamber 61, thence through the opening 63 in the partition 62 to the upper control chamber 60, and thence through the fluid pipe 59 and the connection 18 back to the jacket 15. The fluid-cooling or circulating medium cannot at this time pass downwardly through the hollow neck 75 or upwardly through the hollow neck 68 because said hollow necks are completely shut off or closed by the valves 95 and 84, respectively, as clearly illustrated in Fig. 4. Naturally, the fluid-cooling or circulating medium from the cooling or circulating system of the internal combustion engine which passes through the control chambers 61 and 60 will, upon the heating up of said fluid-cooling or circulating medium due to heating up of the internal combustion engine by operation thereof, cause the upper control bellows 81 and the lower control bellows 92 to become heated. At such time as the temperature of the fluid-cooling or circulating medium of the cooling or circulating system of the internal combustion engine has become heated up to a degree at which it is desirable the fluid of said cooling or circulating system traverse the heating unit 25, the upper and lower bellows 81 and 92 will have expanded sufficiently to allow communication between the fluid pipe 58 and the tube or pipe 51 through the lower control chamber 61 and between the tube or pipe 36 and the fluid pipe 59 through the upper control chamber 60, and to shut off communication between the neck 69 and the boss or protuberance 110 and between the neck 75 and the boss or protuberance 111. Also at this time, the upper valve stem and control plunger 82 will have caused the valve 147 to enter the inlet passageway 140 and caused said passageway to become shut off.

During the interval the internal combustion engine is warming up, the heating device operates in the manner and to the purpose as hereinbefore fully set forth, and when the temperature of the fluid-cooling or circulating medium of the internal combustion engine cooling or circulating system becomes sufficiently warm or hot to properly heat the interior of the automotive vehicle body 22, operation of said heating device is concluded. That is, the inlet passageway 140 is shut off to terminate the drawing or pulling or feeding of combustible fuel mixture into the combustion chamber. The resistance element 124 becomes de-energized during the interval after the internal combustion engine is heating up, and with cessation of feed of combustible fuel mixture to the combustion chamber of the burner, the re-igniter 114 eventually loses its heat. Desirably, the arrangement will be such that the resistance element 124 will stay de-energized so long as the temperature of the fluid-cooling or circulating medium remains sufficiently warm or hot to properly heat the vehicle body. Stated differently, the bimetallic blade 151 is adapted to receive heat by way of the frame 127 from the fluid heating medium which passes through the control chamber 60 to be out of engagement with the conducting element when said fluid heating medium is sufficiently warm or hot to heat the automotive vehicle body, and to engage said conducting element when the fluid heating medium temperature is reduced below the temperature at which it will properly heat said vehicle body. Or, an alternative arrangement can provide that the resistance element 124 remain energized at all times except when the re-igniter 114 is sufficiently hot to itself sustain combustion in the combustion chamber. In any instance where preferred, the electric circuit including the resistance element 124 and the bimetallic blade 151 can be manually broken after the re-igniter 114 has become sufficiently heated to sustain combustion. In any instance, it is desirable that the ball valve 156 be in closed position at all times when the re-igniter 114 is not capable of sustaining combustion.

While the control bellows 81 and 92 are expanded and hot fluid is being caused to circulate from the jacket 15 to the heating unit 25 and back to said jacket 15, the course of the flow of hot fluid through the mechanism 57 is from the fluid pipe 58 into the lower control chamber 61, thence through the boss or protuberance 76 and the tube or pipe 51 into the lower tank 27 of the core of the heating unit, and from the upper tank 26 of said core into the tube or pipe 36 and thence through the boss or protuberance 69, the upper control chamber 60 and the fluid pipe 59 and the connection 18 back to said jacket 15. The opening 63 through the partition 62 is of negligible size and does not appreciably lessen the flow of hot fluid through the heating unit 25 when this is being supplied or provided with fluid-cooling or circulating medium from the internal combustion engine cooling or circulating system.

Attention is called to the fact that in the disclosure of Figs. 1 to 3, hot fluid, liquid or gaseous, as the case may be in a particular instance, supplied or provided by the special heating device of the heating apparatus is caused to flow or travel downwardly through the heating unit 25, while hot fluid supplied or provided by the cooling or circulating system of the internal combustion engine of the automotive vehicle 20 is caused to flow or travel upwardly through said heating unit.

Attention also is called to the fact that should the fluid-cooling or circulating medium of the cooling or circulating system of the internal combustion engine of the automotive vehicle 20 become reduced in temperature to extent sufficient to render said fluid medium unfit for proper heating of the interior space of the body 22 of said automotive vehicle during operation of the internal combustion engine, the parts of the heating apparatus will become operated from the positions as in Fig. 2 to the positions as in Fig. 4, so that hot fluid heating medium will be supplied or provided for and fed to the heating unit 25 by the special heating device.

In practical operation of the heating apparatus, let it be supposed that a person intending to operate the automotive vehicle 20 starts up the engine thereof in winter and when cold, and also closes a switch (or switches) of said heating apparatus which cause the resistance element 124 and the electric motor 38 to be energized and the blower or fan 39 to be put into operation. In just a few seconds real heat is produced in the automotive vehicle body through the instrumentality of hot fluid supplied, provided or fed to the heating unit 25 by the special heating device. A very short while afterwards, say when the automotive vehicle has been driven only a short distance, the fluid-cooling or circulating medium of the cooling or circulating system of the internal combustion engine becomes sufficiently heated to supply or provide heating medium hot enough to the purpose of properly warming the interior space of said automotive vehicle body, and control for the heating medium for the heating unit 25 is turned over to said internal combustion engine cooling or circulating system and taken away from the special heating device. Later, should the temperature of the fluid-cooling or circulating medium of the cooling or circulating system of the internal combustion engine drop to temperature at which unfit to the purpose of properly warming the interior space of the automotive vehicle body, control of the heating medium for said heating unit 25 is turned back to the special heating device and taken away from the internal combustion engine cooling or circulating system.

Evidently, the special heating device which the invention presents can be inexpensively maintained, especially for the reasons that it is required to function for only a short period or interval any time it is placed in operation and that it is but infrequently required to be operated. At the same time, said special heating device renders the heating apparatus altogether efficient, satisfactory and dependable, particularly because of the fact that it is capable of producing quick heat and real heat at the heating unit 25.

In Fig. 7 there is disclosed a heating apparatus of modified construction made according to the invention. A tube or pipe connection 36', equivalent to the tube or pipe connection 36, and a tube or pipe connection 51', equivalent to the tube or pipe connection 51, are supported upon the dash 24' and lead to a heating unit, which could be the heating unit 25, of the heating apparatus disposed within an automotive vehicle body. A fluid connection 159 is adapted to connect the tube or pipe connection 36' with a fluid connection such as 18, and a fluid connection 160 leads from an upper portion of a fluid chamber 106', equivalent to the fluid chamber 106, of a boiler of a heater 161, equivalent to the heater before described, to the tube or pipe connection 51'. A fluid connection 162, equivalent to the fluid connection 58, is adapted to be connected with the jacket, such as 15, of an internal combustion engine cooling and circulating system. The fluid connection 162 leads into a control chamber 163 provided by a bellows housing 164. The base of the bellows housing 164 supports a control bellows 165, equivalent to the control bellows 81, and said control bellows 165 includes a closed upper base which supports a valve stem and control plunger 166, equivalent to the valve stem and control plunger 82. The valve stem and control plunger 166 extends upwardly through an opening 167 in a horizontal partition 168 suitably and conveniently fixed in the bellows housing 164 at location above the fluid connection 162, and an upper portion of said valve stem and control plunger 166 terminates within a part 169 of the control chamber 163 above said horizontal partition 168. The part 169 of the control chamber 163 communicates by way of a fluid connection 170 with a lower portion of the fluid chamber 106'. The fluid connection 170 is, in effect, equivalent to the boss or protuberance 111, and the fluid connection 160 is, in effect, equivalent to the boss or protuberance 110. An intermediate portion of the valve stem and control plunger 166 fixedly carries a disc valve 171 adapted to close the opening 167 in the partition 168 by engagement with a valve seat 172 surrounding and provided by said opening 167. The disc valve 171 is disposed above said partition 168 within the part 169 of the control chamber 163 adjacent the fluid connection 170. The horizontal partition 168 includes a small bleeder hole or port 173 which makes provision for limited passage of fluid medium from the fluid connection 162 through the control chamber 163 and past said partition 168 to the fluid connection 170 when the disc valve 171 is in closed position.

An upper portion 174 of the bellows housing 164, which upper portion 174 is above the horizontal partition 168 in spaced relation thereto, is closed and suitably and conveniently supports the base of a device (equivalent to the device before described and of which the horizontal piece 72 is the base) for allowing and shutting off flow of combustible fuel mixture from a carburetor 175 through a passageway 176 of an inlet pipe 177. The inlet pipe 177 is equivalent to the inlet pipe 138 and leads to the heater or burner 161, which may be of substantially the same construction and operative in substantially the same manner as hereinbefore described in connection with Figs. 1 to 6. The device of Fig. 7 for allowing and shutting off flow of combustible fuel mixture from the carburetor 175 through the inlet passageway 176 to the heater or burner also may be operative substantially in the manner as before set forth. It includes a shut-off rod 178, equivalent to the shut-off rod 146, which extends upwardly through a bellows (not shown), equivalent to the bellows 143, in alining relation to the valve stem and control plunger 166, as well as upwardly through an opening in the base (supported by the closed upper portion 174) of said device for allowing and shutting off flow of combustible fuel mixture. The upper end portion 179 of the shut-off rod 178 is adapted to constitute a shut-off valve, equivalent to the shut-off valve 147, situated in the lower end of the inlet pipe 177 below its passageway 176. A coil spring (not shown) arranged upon the shut-off rod 178, equivalent to the coil spring 148, normally retains the upper end portion or shut-off valve 179 of the shut-off rod 178 in position as disclosed in Fig. 7, and also retains the base of the bellows of the device of said Fig. 7 for allowing and shutting off flow of combustible fuel mixture through the inlet passageway 176 in engagement with the upper end of the valve stem and control plunger 166 upon the control bellows 165, as in Fig. 7. The arrangement is such that when the control bellows 165 is contracted the disc valve 171 is in the closed position of the opening 167, and when said control bellows 165 is expanded the valve stem and control plunger 166 causes said disc valve 171 to be moved to open position and the shut-off rod 178 and its valve 179 to be elevated, against the action of the coil spring, so that the shut-off valve 179 enters the lower end of the inlet passageway 176 to completely shut off communication between the carburetor 175 and the combustion chamber of the burner.

Assuming the parts of the heating apparatus of Fig. 7 to be situated as there shown, with the resistance element of the heater or burner energized and the internal combustion engine of the automotive vehicle having said heating apparatus in operation, liquid fuel mixed with air will be drawn or pulled or fed from the carburetor 175 into the heater by way of the inlet pipe 177, due to suction created in the intake manifold of said internal combustion engine, as before set forth. The combustible fuel mixture will burn in the combustion chamber of the heater, and fluid in the boiler space or fluid chamber 106' will be heated. The products of combustion, when spent and comparatively cool, will pass to the intake manifold of the internal combustion engine. Evidently, there will be force or pressure feed of the hot fluid upwardly through said boiler space or fluid chamber 106' caused by force or pressure feed of fluid-cooling or circulating medium of the cooling or circulating system of said internal combustion engine. More explicitly, there will not only be force or pressure feed of fluid-cooling or circulating medium upwardly through the boiler space of fluid chamber 106', but there also will be force or pressure feed of the fluid-cooling or circulating medium upwardly through the heating unit, such as 25, of the heating apparatus. That is, when the elements of the heating apparatus are situated as in Fig. 7, fluid-cooling or circulating medium will be forced from the engine jacket, such as 16, to the fluid connection 162, thence through the control chamber 163 and the bleeder hole or port 173 in the horizontal partition 168 to the fluid connection 170, thence through the boiler space or fluid chamber 106' to the fluid connection 160, thence through the tube or pipe 51' to the heating unit, thence upwardly through said heating unit, and thence through the tube or pipe 36', the fluid connection 159 and a fluid connection such as 18 back to the engine jacket. In passing through the heating unit the hot fluid medium will give up its heat to the tubes and fins of said heating unit, and the blower or fan will cause the heat to be distributed throughout the automotive vehicle body, as before set forth.

When the fluid-cooling or circulating medium of the cooling or circulating system of the internal combustion engine of an automotive vehicle having the heating apparatus of Fig. 7 is below a set and predetermined temperature at or above which said fluid-cooling or circulating medium should be to properly heat the interior space of the body of said automotive vehicle, the control bellows 165 is contracted, and the valve stem and control plunger 166 will be positioned to situate the disc valve 171 in closed position and to situate the valve 179 as in said Fig. 7, in spaced relation to the inlet passageway 176 through the inlet pipe 177. Supposing the internal combustion engine to be started up cold with the parts of the heating apparatus positioned as in Fig. 7, the resistance element of the heater being energized, the course of the fluid-cooling or circulating medium of the cooling or circulating system of said internal combustion engine will be through the control chamber 163, as stated. The fluid-cooling or circulating medium cannot at this time pass freely through said control chamber 163 because the disc valve 171 is in closed position. Instead, the passage of fluid-cooling or circulating medium through the control chamber 163, and hence through the boiler space or fluid chamber 106', will be considerably limited by the size of the bleeder hole or port 173. Due to the comparatively slow travel of fluid medium through the boiler space or fluid chamber 106' all of the fluid medium which passes said boiler space or fluid chamber is adapted to be thoroughly heated. Upon the heating up of the fluid-cooling or circulating medium due to heating up of the internal combustion engine by operation thereof, said fluid-cooling medium will, by reason of its contact with the control bellows 165, cause said control bellows to become heated. At such time as the temperature of the fluid-cooling or circulating medium of the cooling or circulating system of the internal combustion engine has become heated up to a degree at which it is desirable that the fluid of said cooling or circulating system traverse the heating unit, such as 25, of the heating apparatus, the control bellows 165 will have expanded and caused the disc valve 171 to be moved to open position to allow free or unrestricted communication between the fluid connection 162 and the tube or pipe 51', of course by way of the control chamber 163 and the boiler space or fluid chamber 106'. Also at this time, the valve stem and control plunger 166 will have caused the valve 179 to enter the inlet passageway 176 and caused said passageway to be shut off. Obviously, when the disc valve 171 is in open position the flow of fluid medium through the control chamber 163, the fluid chamber 106' and the heating unit, such as 25, will be considerably more rapid than when said disc valve 171 is in closed position and the flow is restricted or limited to that which can pass the bleeder hole or port 173.

During the interval the internal combustion engine is warming up, the heating device 161 operates in the manner and to the purpose as aforesaid, and when the temperature of the fluid-cooling or circulating medium of the internal combustion engine cooling or circulating system becomes sufficiently warm or hot to properly heat the interior of the automotive vehicle body, operation of said heating device is concluded. That is, the inlet passageway 176 is shut off to terminate the drawing or pulling or feeding of combustible fuel mixture into the combustion chamber. The resistance element of the burner 161 becomes de-energized as before described, and with cessation of feed of combustible fuel mixture to the combustion chamber of the burner, the re- igniter loses its heat. However, the resistance element will stay de-energized so long as the temperature of the fluid-cooling or circulating medium within the fluid chamber 106' remains sufficiently warm or hot to properly heat the vehicle body. The resistance element can be manually caused to be de-energized in any instance where this is desired.

While the control bellows 165 is expanded and hot fluid medium is being caused to circulate from the engine jacket to the heating unit and back to the jacket, the course of flow of hot fluid medium is the same as before, except that the flow is not restricted. Both when the disc valve 171 is in open and in closed position, hot fluid medium, liquid or gaseous, as the case may be in a particular instance, is forced to flow upwardly through the heating unit. The direction of flow through said heating unit can of course be downwardly in any instance where this is considered preferable. Should the fluid-cooling or circulating medium become reduced in temperature to extent sufficient to render said fluid medium unfit for proper heating of the automotive vehicle body during operation of the internal combustion engine, the parts of the heating apparatus will become operated to the positions as in Fig. 7, and the special heating device 161 will be set in operation while pressure or force feed causes flow of fluid medium through the heating apparatus past the bleeder hole or port 173.

The heating apparatus of Fig. 7 will operate to the accomplishment of the results as set forth in connection with the heating apparatus of Figs. 1 to 6, and can be inexpensively maintained for the reasons stated in connection with said heating apparatus of said Figs. 1 to 6.

Attention is called to the fact that while in Fig. 7 there is disclosed a construction and arrangement for forcing heating fluid medium through the bleeder hole or port 173 when the disc valve 171 is in closed position, as well as through the boiler and the heating unit, from and circulated by the internal combustion engine cooling or circulating system, heating fluid medium could in some instance or other be forced past said boiler and heating unit through the instrumentality of a means other than said cooling or circulating system when said disc valve 171 is closed. Actually, the heating fluid medium forced through the fluid chamber 106' and the heating unit while the disc valve 171 is in closed position could be supplied from a source other than the cooling or circulating system of the internal combustion engine, as will be obvious.

Figure 9:
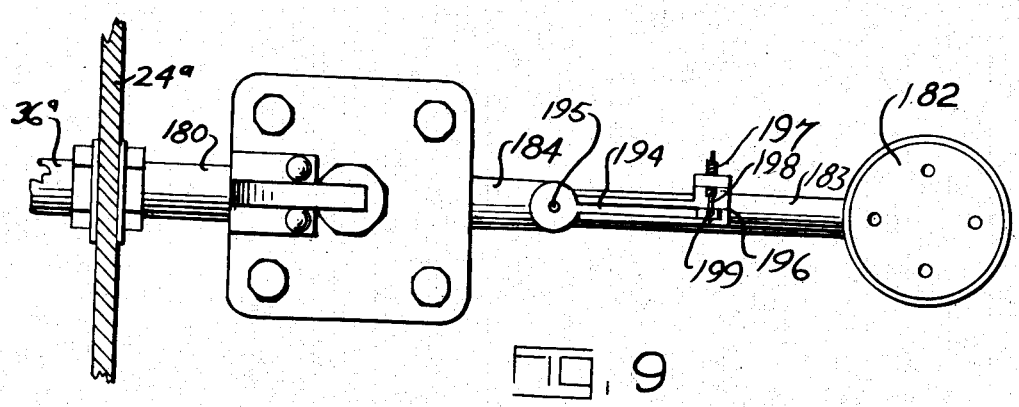
Fig. 9 is a top plan view of the heating apparatus of Fig. 8.

In Figs. 8 and 9 there is disclosed a heating apparatus of further modified construction made according to the invention. A tube or pipe connection 36a, equivalent to the tube or pipe 36, and a tube or pipe connection 51a, equivalent to the tube or pipe 51, are supported upon the dash 24a and lead to a heating unit, which could be the heating unit 25, of the heating apparatus. A fluid connection 180 extends between the tube or pipe connection 36a and an upper portion of a fluid chamber 106a, equivalent to the fluid chamber 106, of a boiler of a heater 161a, equivalent to the heater before described, and a fluid connection 181 extends between the tube or pipe connection 51a and a lower portion of said fluid chamber 106a.

A pressure equalizing tank 182, desirably at elevation above the boiler space or fluid chamber 106a, communicates with a lower portion of said boiler space or fluid chamber 106a through a gravity flow pipe 183. In some instances, the pressure equalizing tank 182 and the gravity flow pipe 183 may be omitted, and in other instances pressure within the boiler space or fluid chamber 106a may be equalized by connecting the jacket of an internal combustion engine cooling or circulating system with a portion of said boiler space or fluid chamber 106a in such manner that heating fluid medium will flow to the boiler space or fluid chamber from said jacket.

The heater 161a of Figs. 8 and 9 can be of substantially the same construction and operative in substantially the same manner as hereinbefore set forth in connection with Figs. 1 to 7, inclusive, except in particulars as now to be explained. An inlet pipe 184, equivalent to the inlet pipe 138, leads to the heater 161a from a carburetor 185, and includes an inlet passageway 186. A manually actuatable shut-off valve 187 for the inlet passageway 186 is disposed in a vertical portion 188 of said passageway 186 in contiguous relation to a horizontal portion 189 of the passageway opening directly to a passageway 190 itself communicating with the combustion chamber of said heater 161a. The shut-off valve 187 is constituted as a hollow tube snugly rotatable in the vertical portion 188 of the inlet passageway 186 and closed at its upper portion by a plug 191 which is integral or rigid with said hollow tube shut-off valve 187. The plug 191 is snugly rotatable, as at 192, in the upper end of the inlet pipe 184, and closes said upper end of said inlet pipe in fluid-tight manner. A circular opening 193 through the wall of the hollow tube shut-off valve 187 is adapted to be out of alinement with the horizontal portion of the inlet passageway 186, as in Fig. 8, by rotation of the plug 191 and said hollow tube shut-off valve 187 to the position shown, to shut off communication between the vertical portion 188 and the longitudinal portion 189 of the inlet passageway 186, to thus shut off communication between the carburetor 185 and the combustion chamber by way of the inlet pipe 184. Said circular opening 193 also is adapted to be situated adjacent to and in alining relation with said horizontal portion 189 of said inlet passageway 186, by rotation of said plug 191 and shut-off valve 187 to corresponding position, to thus allow communication between said carburetor and said combustion chamber.

A horizontal operating lever 194, for causing the plug 191 with shut-off valve 187 to be rotated within the inlet pipe 184 between the position as in Figs. 8 and 9 and the position of said shut-off valve 187 adapted to afford communication between the carburetor 185 and the combustion chamber, is as disclosed rigidly secured to the plug 191 through the instrumentality of a pin 195 which passes through and is rotatably mounted in a bracket 196 made stationary in any suitable and convenient manner. A hollow flexible tube 197 is made rigid with the bracket 196, as well as rigid with some other fixed part of the structure, and a manipulating wire 198 is secured, as at 199, to an outer end portion of the operating lever 194. Said manipulating wire 198 extends through and is longitudinally slidable in the hollow flexible tube 197. The end portion of the manipulating wire 198 opposite the operating lever 194 extends outwardly beyond the corresponding end of the hollow flexible tube 197, and is adapted to be pushed and pulled to thus cause the hollow tube shut-off valve 187 selectively to be situated as in Figs. 8 and 9, or in position where communication between the carburetor 185 and the combustion chamber of the heater 161a is accomplished. When the heating apparatus of Figs. 8 and 9 is employed in an automotive vehicle the arrangement desirably will be such that the wire 198 can be pushed and pulled, and thus manipulated, from position adjacent the dash 24a of the automotive vehicle, as will be understood.

The parts of the heating apparatus of Figs. 8 and 9 are positioned as there shown to render said heating apparatus inoperative. When it is desired that the heating apparatus become operative, the lever 194 is actuated to aline the circular opening 193 in the shut-off valve 187 with the horizontal portion 189 of the inlet passageway 186. Assuming the resistance element of the heater 161a to be energized and the internal combustion engine to be operating, liquid fuel mixed with air will be drawn or pulled or fed from the carburetor 185 into the heater by way of the inlet pipe 184 and the passageway 190, due to suction created in the intake manifold, as hereinbefore made plain. The combustible fuel mixture will burn in the combustion chamber of the heater 161a, and fluid in the boiler space or fluid chamber 106a will be heated. The products of combustion, when spent and comparatively cool, will pass to the intake manifold. Hot fluid medium, whether liquid or gaseous, as the case may be, created in the fluid chamber 106a of the boiler will rise to the top or upper portion of said boiler and traverse the fluid passageway 180 and the tube or pipe 36a over to the heating unit, such as 25. The hot fluid medium will flow downwardly through said heating unit and give up its heat thereto. If the hot fluid medium is steam, or gaseous, it will be condensed in the core of the heating unit, as hereinbefore set forth. In any event, the hot fluid medium will pass downwardly by gravity through the core of the heating unit and travel by way of the tube or pipe 51a back into the boiler space or fluid chamber 106a. The resistance element of the heater 161a is energized during the starting period of the burner, as already made plain, and becomes de-energized by application of heat from the combustion chamber. Upon de-energization of said resistance element combustion is sustained by the re-igniter of the heater so long as the feed of combustible fuel mixture to the combustion chamber is continued. The supply of combustible fuel mixture is shut off by actuation of the shut-off valve 187 to the position as in Figs. 8 and 9. Desirably, the heating apparatus of Figs. 8 and 9 will include a switch, or other manually actuatable means, for breaking the electrical circuit including the resistance element of the heater 161a when this is intentional.

Figure 10:
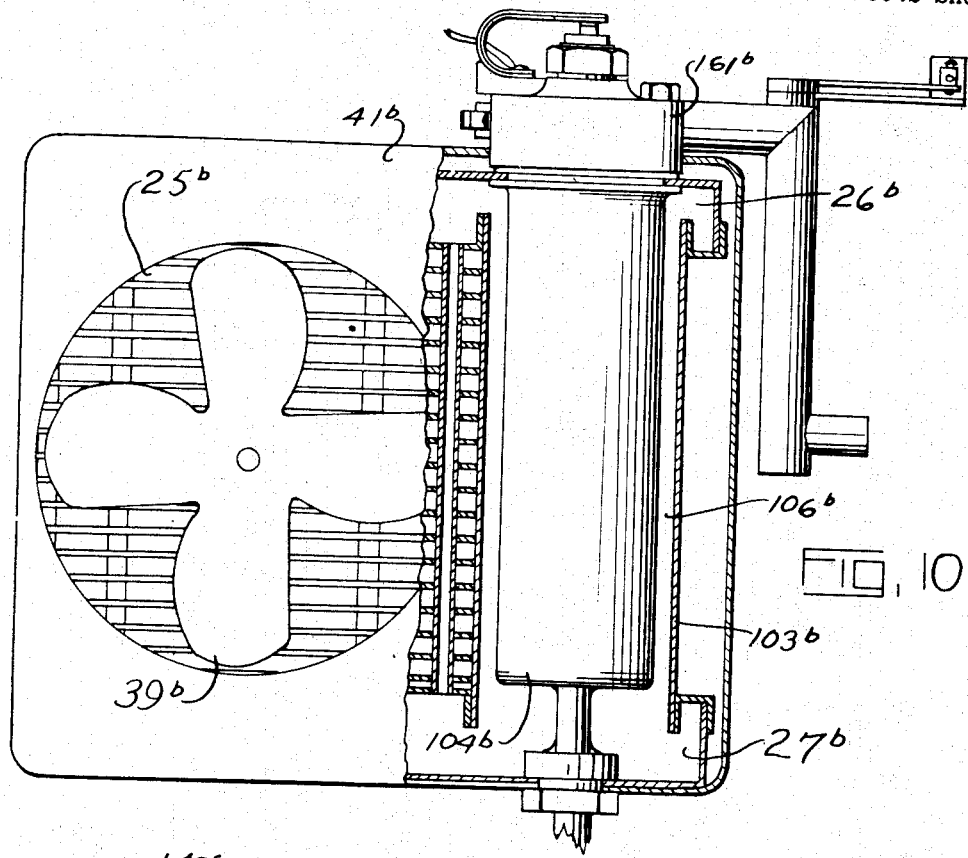
Fig. 10 is a rear elevational view, partially in section and partially broken away, of a heating apparatus of still further modified construction made according to the invention.

In Fig. 10 there is disclosed a heating apparatus of still further modified construction made according to the invention. The present heating apparatus includes a heating unit 25b, an electric motor for driving a blower or fan 39b, a casing 41b, a boiler with outer boiler shell 103b and inner boiler core 104b, and a heater 161b including elements as described in connection with the heater of Figs. 8 and 9. The boiler including the outer boiler shell 103b and the inner boiler core 104b is built directly into the heating unit 25b, and a boiler space or fluid chamber 106b is provided between said outer boiler shell 103b and said inner boiler core 104b. The heater 161b and said boiler are at one side of the electric motor and blower or fan. The upper tank 26b of the core of the heating unit 25b is open to the upper portion of the boiler space or fluid chamber 106b, and the lower portion of said boiler space or fluid chamber 106b is open to the lower tank 27b of said core. The heater 161b is as disclosed of the same general structure and operative in the same general manner as set forth in connection with Figs. 8 and 9.

Hot fluid medium, whether liquid or gaseous, as the case may be, created in the fluid chamber 106b of the boiler of the heater 161b of Fig. 10 will rise to the top or upper portion of said fluid chamber 106b and enter the upper tank 26b. Upon entering said upper tank the hot fluid medium will flow or be forced downwardly through the tubes of the core of the heating unit 25b and give up its heat to said tubes and the fins thereon. If the hot fluid medium is steam, or gaseous, it will be condensed in the core of the heating unit. The hot fluid medium will pass downwardly by gravity through the core of the heating unit 25b and enter the lower tank 27b. The fluid medium to be heated in the fluid chamber 106b of course continuously is supplied from the lower tank 27b. The resistance element of the heater 161b is energized during the starting period of the burner, and becomes de-energized by application of heat from the combustion chamber of said heater 161b. Upon de-energization of the resistance element combustion is sustained by the re-igniter of the heater, as hereinbefore set forth, so long as the feed of combustible fuel mixture to the combustion chamber is continued. The supply of combustible fuel mixture is maintained and shut off by actuation of a shut-off valve operated and operative in the same general manner as stated in connection with the hollow tube shut-off valve 187 of Figs. 8 and 9. The heating apparatus of Fig. 10, like the heating apparatus of said Figs. 8 and 9, desirably will include a switch, or other manually actuatable means, for breaking the electrical circuit including the resistance element of the heater 161b when this is intentional.

Figure 11:
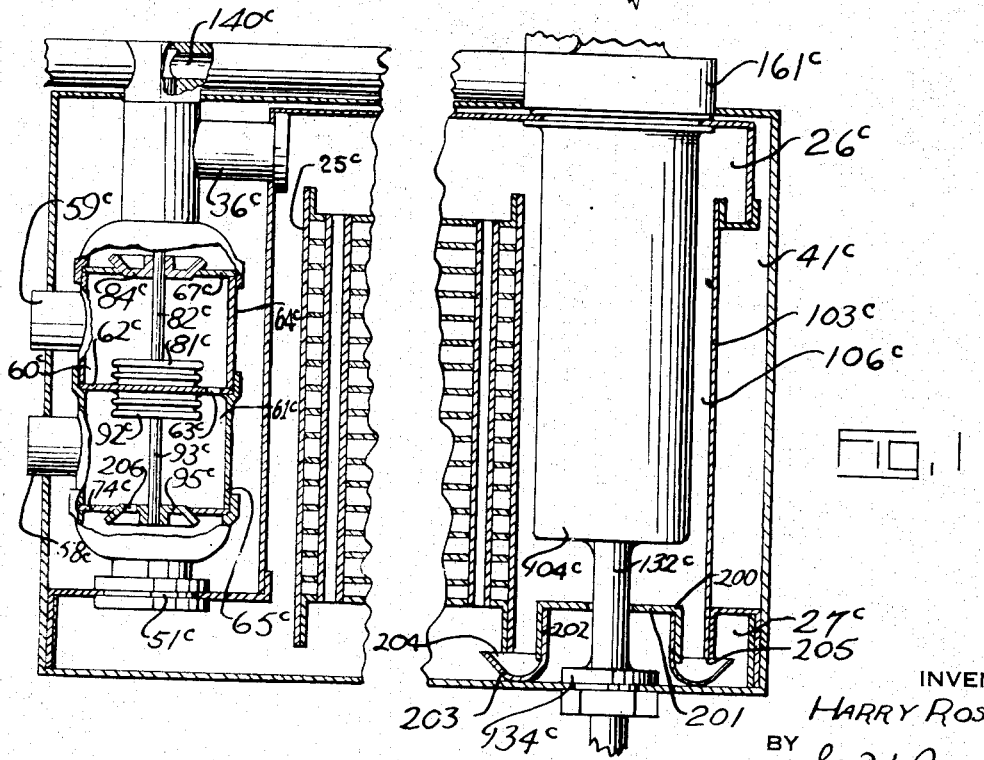
Fig. 11 is a vertical sectional view, partially in side elevation and partially broken away, of a heating apparatus of yet still further modified construction including features and characteristics of the invention.

In Fig. 11 there is disclosed a heating apparatus of yet still further modified construction made according to the invention. The present heating apparatus includes a heating unit 25c, with electric motor and blower or fan (not shown), a casing 41c, an upper control bellows chamber 60c, a lower control bellows chamber 61c, an upper bellows housing 64c, a lower bellows housing 65c, an upper control bellows 81c, an upper valve stem and control plunger 82c with disc valve 84c for opening and closing a partition 67c in the bellows housing 64c, a lower control bellows 92c, a lower valve stem 93c with disc valve 95c for opening and closing a partition 74c in the bellows housing 65c, a boiler with outer boiler shell 103c and inner boiler core 104c, and a heater 161c including elements as described in connection with the heater of Figs. 1 to 6. The boiler including the outer boiler shell 103c and the inner boiler core 104c is built directly into the heating unit 25c, and a boiler space or fluid chamber 106c is provided between said outer boiler shell 103c and said inner boiler core 104c. The heater 161c and said boiler are at one side of the electric motor and blower or fan. The upper tank 26c of the core of the heating unit 25c is open to the upper portion of the boiler space or fluid chamber 106c, and the lower portion of said boiler space or fluid chamber 106c is adapted to open to the lower tank 27c of said core. The heater 161c is as disclosed of the general structure and operative in the same manner as set forth in connection with the heater of Figs. 1 to 6.

The upper control chamber 60c is connected with the upper tank 26c of the heating unit 25c by a tube or pipe 36c, and the lower tank 27c of said heating unit is connected with the lower control chamber 61c as at 51c. The disc valve 84c will control passage of hot fluid medium from the tube or pipe 36c to a fluid connection 59c leading to a fluid connection such as 18 in Fig. 1, and the disc valve 95c will control passage of hot fluid medium from a fluid connection 58c leading from a jacket such as 15 in said Fig. 1 to the lower tank 27c.

In said Fig. 11, a tubular connector 132c (equivalent to the tubular connector 132 and for the same purpose) extends centrally downwardly from the inner boiler core 104c and is secured to the base of the lower tank 27c by a fitting 134c. A light closure valve 200 includes a base 201 thereof mounted for longitudinal movement upon said tubular connector 132c. The base 201 of the closure valve 200 is slidable upon an intermediate portion of the tubular connector 132c, and said closure valve 200 includes an annular skirt 202 which extends downwardly from said base 201. In turn, the annular skirt 202 of the closure valve 200 merges in an annular seating portion 203 of said closure valve situated within the lower tank 27c directly beneath the boiler space or fluid chamber 106c. The construction and arrangement is such that when the light closure valve 200 is in lowered position the lower surface of the annular seating portion 203 of said closure valve will rest upon the base of the lower tank 27c to provide an annular passageway 204 between the lower open circular end portion 205 of the outer boiler shell 103c and the control valve 200 and its annular skirt 202 and annular seating portion 203, and hence between the lower tank 27c and the boiler space or fluid chamber 106c, as in Fig. 11. The construction and arrangement is also such that when said control or closure valve 200 is in elevated position the upper surface of said annular seating portion 203 will engage beneath and against said lower open circular end 205 of said outer boiler shell 103c to preclude the passage of fluid medium upwardly from said lower tank 27c into said boiler space or fluid chamber 106c.

A partition 62c, equivalent to the partition 62 and for the same purpose, includes a small opening 63 of the same nature and for the same purpose as the small opening 63. The disc valve 95c has an opening 206 for permitting passage of fluid medium in limited quantity from the fluid connection 58c to the lower tank 27c when said disc valve 95c is in closed position. The opening 206 could just as well be situated in the partition 74c.

The construction of Fig. 11 will operate in about the way as described in connection with Figs. 1 to 6, except that the control bellows 92c and 81c will function to control only the travel or passage of hot fluid medium from the fluid connection 58c to the lower tank 27c and the travel or passage of hot fluid medium from the tube or pipe 36c to the fluid connection 59c, and to cause an inlet passageway 140c, equivalent to the inlet passageway 140, from a carburetor to the combustion chamber of the heater 161c to be open when the control bellows 81c is contracted and to be shut-off when said control bellows is expanded, in about the manner as hereinbefore set forth.

When the fluid-cooling or circulating medium of the cooling or circulating system of the internal combustion engine of an automotive vehicle equipped with a heating apparatus as in Fig. 11 is below a set and predetermined temperature at or above which said fluid-cooling or circulating medium should be to properly heat the interior space of the body of said automotive vehicle, the control bellows 81c and 92c will be contracted, and the upper valve stem and control plunger 82c will be positioned to situate the shut-off valve for controlling flow of combustible fuel mixture from the carburetor employed to the combustion chamber of the heater 161c out of the inlet passageway 140c. Supposing the internal combustion engine of the automotive vehicle to be started up cold with the parts of the heating apparatus of Fig. 11 situated as disclosed in said figure, the resistance element of the heater 161c being energized, the course of the fluid-cooling or circulating medium of the cooling or circulating system of the internal combustion engine from the jacket thereof to the heating apparatus and back to the jacket will be through the fluid connection 58c to the lower control chamber 61c, thence through the opening 63c in the partition 62c to the upper control chamber 60c, and thence through the fluid connection 59c and a fluid connection such as 18 in Fig. 1 back to the engine jacket. The fluid-cooling or circulating medium cannot at this time travel downwardly or upwardly past the disc valves 95c and 84c because said disc valves are closed. Upon heating up of the fluid-cooling or circulating medium due to heating up of the internal combustion engine by operation thereof, the upper and lower control bellows 81c and 92c will become heated. At such time as the temperature of the fluid-cooling or circulating medium of the cooling or circulating system of the internal combustion engine has become heated up to a degree at which it is desirable that fluid of said cooling or circulating system traverse the heating unit 25c, the upper and lower bellows 81c and 92c will have expanded sufficiently to allow communication between the fluid connection 58c and the lower tank 27c through the lower control chamber 61c and between the tube or pipe 36c and the fluid connection 59c through the upper control chamber 60c. Also at this time, the upper valve stem and control plunger 82c will have caused the shut-off valve for the inlet passageway 140c to enter said inlet passageway and cut off communication between the carburetor and the combustion chamber of the heater 161c.

During the interval the internal combustion engine is warming up, the heating device 161c operates in the manner and to the purpose as before described, and when the temperature of the fluid-cooling or circulating medium of the internal combustion engine cooling or circulating system becomes sufficiently warm or hot to properly heat the interior of the body of the automotive vehicle, operation of said heating device is concluded by automatic shutting off of the inlet passageway 140c to terminate the drawing or pulling or feeding of combustible fuel mixture into the combustion chamber. As stated in connection with the disclosure of Figs. 1 to 6, the resistance element of the heater 161c becomes de-energized during the interval after the internal combustion engine is heating up, and with cessation of feed of combustible fuel mixture to the combustion chamber of the burner, the re-igniter loses its heat.

While the control bellows 81c and 92c are expanded and hot fluid medium is being caused to circulate from the jacket of the internal combustion engine to the heating unit 25c and back to said jacket, the course of the flow of hot fluid medium is from the fluid connection 58c through the lower control chamber 61c into the lower tank 27c, upwardly through the tubes of the heating unit 25c into the upper tank 26c, and back to the fluid connection 59c through the tube or pipe 36c and the upper control chamber 60c. The opening 63c does not appreciably lessen the flow of hot fluid medium through the heating unit 25c when this is being supplied or provided with fluid cooling or circulating medium from the internal combustion engine cooling or circulating system. The construction and arrangement is such that the light closure valve 200 is caused to be lifted and slid longitudinally upwardly upon the tubular connector 132c in response to flow of hot fluid medium through the heating unit 25c while the disc valves 84c and 95c are in open position. That is, flow of fluid-cooling or circulating medium from the internal combustion engine cooling or circulating system is sufficient when the disc valves 84c and 95c are open to cause the light closure valve 200 to be elevated in response to the flow to position causing the annular sealing portion 203 of said closure valve 200 to be seated against the lower open circular end 205 of the outer boiler shell 103c. Thus, when the internal combustion engine cooling or circulating system is supplying hot fluid medium to the heating unit 25c none of the hot fluid medium supplied passes through the boiler space or fluid chamber 106c. Instead, all of the hot fluid medium passes upwardly through the tubes of said heating unit. When the flow from the internal combustion engine cooling or circulating system ceases, the light closure valve 200 returns by gravity to the position as in Fig. 11.

The small opening 206, in the disc valve 95c as disclosed, is for the purpose of causing pressure to be equalized in the core of the heating unit 25c. When the heater 161c of the heating apparatus of Fig. 11 is operative, the disc valves 84c and 95c at this time being in closed position, hot fluid medium, whether liquid or gaseous, created in the boiler space or fluid chamber 106c will rise in said boiler space or fluid chamber 106c to the top or upper portion thereof and pass into the upper tank 26c. Upon entering the upper tank 26c the hot fluid medium will flow or be forced downwardly through the tubes of the core of the heating unit 25c and give up its heat to said tubes and the fins thereon. If the hot fluid medium is steam, or gaseous, it will be condensed in the core of the heating unit. The hot fluid medium will pass downwardly by gravity through the core of the heating unit 25c and enter the lower tank 27c. The fluid medium to be heated in the fluid chamber 106c of course is supplied from the lower tank 27c. The light closure valve 200 remains in position as in Fig. 11 when the heater 161c is operative to supply hot fluid medium to the heating unit 25c, so that said fluid medium travels into the fluid chamber 106c from the lower tank 27c by way of the annular passageway 204.

In the disclosure of Fig. 11, hot fluid medium, liquid or gaseous, as may be the case in some particular instance, supplied by the heater 161c is caused to flow or travel downwardly through the heating unit 25c, while hot fluid medium supplied by the cooling or circulating system of the internal combustion engine employed in connection with the heating apparatus of said Fig. 11 is caused to flow or travel upwardly through said heating unit 25c.

Should the fluid-cooling or circulating medium of the cooling or circulating system of the internal combustion engine employed in connection with the heating apparatus of Fig. 11 become reduced in temperature to extent sufficient to render said fluid medium unfit for proper heating during operation of the internal combustion engine, the parts of said heating apparatus will become operated to the positions as in said Fig. 11, and the heater 161c automatically will be set in operation while fluid medium under pressure at the small opening 206 causes proper pressures to exist in the heating unit 25c and the fluid chamber 106c.

The heating apparatus of Fig. 11 will operate to the accomplishment of the results as recited in connected with the heating apparatus of Figs. 1 to 6, and can be inexpensively maintained for the reasons hereinbefore set forth.

What is claimed is:

1. The combination with the fluid cooling system of an internal combustion engine, of independent heater means, control means for said heater means, heat transfer means, means connecting said cooling system and said heater means, respectively, to said heat transfer means, flow control means in said connecting means, and thermostatic means responsive to the temperature of the fluid in said cooling system for actuating said flow and heater control means upon a decrease in fluid temperature to cause flow to be at least substantially shut off from the cooling system to the heat transfer means and to render the heater means operative and upon an increase in fluid temperature to cause flow in substantial quantity from said cooling system to said heat transfer means and to render said heater means inoperative.

2. The combination with the fluid cooling system of an internal combustion engine, of independent heater means, control means for said heater means, heat transfer means, means connecting said cooling system and said heater means, respectively, to said heat transfer means, flow control means in said connecting means, and thermostatic means responsive to the temperature of the fluid in said cooling system for actuating said flow and heater control means upon a decrease in fluid temperature to cause flow to be at least substantially shut off from the cooling system to the heat transfer means and to render the heater means operative and upon an increase in fluid temperature to cause flow in substantial quantity from said cooling system to said heat transfer means and to render said heater means inoperative, said connecting means being adapted to convey fluid for heating purposes to the heat transfer means from the heater means while said heater means is operative and flow from said cooling system to said heat transfer means is at least substantially shut off.

3. The combination with the fluid cooling system of an internal combustion engine, of independent heater means, control means for said heater means, heat transfer means, means connecting said cooling system and said heater means, respectively, to said heat transfer means, flow control means in said connecting means, and thermostatic means responsive to the temperature of the fluid in said cooling system for actuating said flow and heater control means upon a decrease in fluid temperature to cause flow to be at least substantially shut off from the cooling system to the heat transfer means and to render the heater means operative and upon an increase in fluid temperature to cause flow in substantial quantity from said cooling system to said heat transfer means and to render said heater means inoperative, said connecting means including elements thereof adapted to convey fluid for heating purposes to the heat transfer means from the heater means at least partially by thermosyphon action while said heater means is operative and flow from said cooling system to said heat transfer means is at least substantially shut off.

4. The combination with the fluid cooling system of an internal combustion engine, of independent heater means, control means for said heater means, heat transfer means, a blower adapted to be driven to cause air to be circulated in contact with said heat transfer means, means connecting said cooling system and said heater means, respectively, to said heat transfer means, flow control means in said connecting means, and thermostatic means responsive to the temperature of the fluid in said cooling system for actuating said flow and heater control means upon a decrease in fluid temperature to cause flow to be at least substantially shut off from the cooling system to the heat transfer means and to render the heater means operative and upon an increase in fluid temperature to cause flow in substantial quantity from said cooling system to said heat transfer means and to render said heater means inoperative, said connecting means including elements thereof adapted to convey fluid for heating purposes to the heat transfer means from the heater means while said heater means is operative and flow from said cooling system to said heat transfer means is at least substantially shut off.

5. The combination with the fluid cooling system of an internal combustion engine, of independent heater means, control means for said heater means, heat transfer means, first means and second means connecting said cooling system and said heater means, respectively, to said heat transfer means, said first and second connecting means including elements in common, flow control means in said first connecting means, and thermostatic means responsive to the temperature of the fluid in said first connecting means for actuating said flow and heater control means upon a decrease in fluid temperature to cause flow to be at least substantially shut off from the cooling system to the heat transfer means and to render the heater means operative and upon an increase in fluid temperature to cause flow in substantial quantity from said cooling system to said heat transfer means and to render said heater means inoperative.

6. The combination with the fluid cooling system of an internal combustion engine, of independent heater means, control means for said heater means, heat transfer means, first means and second means connecting said cooling system and said heater means, respectively, to said heat transfer means, said first and second connecting means having elements in common, flow control means in said first connecting means, and thermostatic means responsive to the temperature of the fluid of said cooling system in said first connecting means for actuating said flow and heater control means upon a decrease in fluid temperature to cause flow to be at least substantially shut off from the cooling system to the heat transfer means and to render the heater means operative and upon an increase in fluid temperature to cause flow in substantial quantity from said cooling system to said heat transfer means and to render said heater means inoperative, said second connecting means being adapted to convey fluid for heating purposes to the heat transfer means from the heater means while said heater means is operative and flow from said cooling system to said heat transfer means is at least substantially shut off.

7. The combination with the fluid cooling system of an internal combustion engine, of a first tube to be connected to a fuel supply pipe adapted to lead from a carburetor, a second tube to be connected to the intake manifold of said internal combustion engine, independent heater means providing a passage between said first and second tubes, heat transfer means, means connecting said cooling system and said heater means, respectively, to said heat transfer means, flow control means in said connecting means, means for controlling travel of fuel through the passage of said heater means, means for igniting fuel within said heater means passage, and thermostatic means responsive to the temperature of the fluid in said cooling system for actuating said flow control means and said means for controlling travel of fuel upon a decrease in fluid temperature to cause flow to be at least substantially shut off from the cooling system to the heat transfer means and permit travel of fuel through said passage and upon an increase in fluid temperature to cause flow in substantial quantity from said cooling system to said heat transfer means and interrupt travel of fuel through said passage.

8. The combination with the fluid cooling system of an internal combustion engine, of a first tube to be connected to a fuel supply pipe adapted to lead from a carburetor, a second tube to be connected to the intake manifold of said internal combustion engine, independent heater means providing a passage between said first and second tubes, heat transfer means, first means and second means connecting said cooling system and said heater means, respectively, to said heat transfer means, said first and second connecting means including elements in common, flow control means in said first connecting means, means for controlling travel of fuel through the passage of said heater means, means for igniting fuel within said heater means passage, and thermostatic means responsive to the temperature of the fluid of said cooling system in said first connecting means for actuating said flow control means and said means for controlling travel of fuel upon a decrease in fluid temperature to cause flow to be at least substantially shut off from the cooling system to the heat transfer means and permit travel of fuel through said passage and upon an increase in fluid temperature to cause flow in substantial quantity from said cooling system to said heat transfer means and interrupt travel of fuel through said passage, said second connecting means being adapted to convey fluid for heating purposes to the heat transfer means from the heater means while said heater means is operative and flow from said cooling system to said heat transfer means is at least substantially shut off.

9. The combination with the fluid cooling system of an internal combustion engine, of independent heater means, control means for said heater means, heat transfer means, first means and second means connecting said cooling system and said heater means, respectively, to said heat transfer means, flow control means in said first connecting means, and thermostatic means responsive to the temperature of the fluid in said first connecting means for actuating said flow and heater control means upon a decrease in fluid temperature to shut off flow and render the heater means operative and upon an increase in fluid temperature to cause flow and render the heater means inoperative.

10. The combination with the fluid cooling system of an internal combustion engine, of independent heater means, control means for said heater means, heat transfer means, means connecting the heat transfer means, the heater means and said cooling system in a common circuit, flow control means for said common circuit, and thermostatic means responsive to the temperature of the fluid in said cooling system for actuating said flow and heater control means upon a decrease in fluid temperature to cause relatively small flow from said cooling system by way of said heater means to said heat transfer means and to render the heater means operative and upon an increase in fluid temperature to cause comparatively greater flow from the cooling system to the heat transfer means and to render said heater means inoperative.

11. A heating apparatus comprising means for diverting fluid-cooling medium from a circulating system of an internal combustion engine and for utilizing the diverted fluid-cooling medium in said heating apparatus as heated fluid medium for raising the temperature of the heating apparatus, means independent of said internal combustion engine circulating system for causing heat to be imparted to a portion of said fluid-cooling medium and for causing said heated portion of the fluid-cooling medium to be employed as heated fluid medium for raising the temperature of said heating apparatus, and devices including thermostatic means responsive to the temperature of the fluid medium operative to render said first mentioned means incapable of supplying heated fluid medium to said heating apparatus when said independent means is operative to cause heated fluid medium to be supplied to said heating apparatus and to render said independent means incapable of supplying heated fluid medium to said heating apparatus when said first mentioned means is operative to cause heated fluid medium to be supplied to said heating apparatus.

12. A combination heated fluid medium and hot vapor medium heating apparatus, comprising a heating unit including a blower adapted to be driven to cause air to be circulated in contact with said heating unit, means through the instrumentality of which said heating unit can utilize fluid-cooling medium from and heated by and circulated by the circulating system of an internal combustion engine as heated fluid medium for causing the heating unit to be heated, means through the instrumentality of which said heating unit can be supplied independently of said internal combustion engine circulating system as such with hot vapor medium to be utilized to heat said heating unit, thermostatically actuated means responsive to the temperature of the fluid medium for rendering the first mentioned means incapable of supplying heated fluid medium to said heating unit when the second mentioned means is causing hot vapor to be supplied to the heating unit, and means for rendering said second mentioned means incapable of supplying hot vapor medium to the heating unit when said first mentioned means is causing heated fluid medium to be supplied to said heating unit.

13. A combination heated fluid medium and hot fluid medium heating apparatus, comprising a heating unit including a blower adapted to be driven to cause air to be circulated in contact with said heating unit, means through the instrumentality of which said heating unit can utilize fluid-cooling medium from and heated by and circulated by a circulating system of an internal combustion engine as heated fluid medium for causing the heating unit to be heated, means including a boiler and a burner for heating said boiler through the instrumentality of which said heating unit can be supplied with hot fluid medium to be utilized to heat the heating unit, and temperature responsive means responsive to the temperature of the fluid medium for rendering the first mentioned means incapable of supplying heated fluid medium to said heating unit when the second mentioned means is causing hot fluid medium to be supplied to the heating unit and for rendering said second mentioned means incapable of supplying hot fluid medium to said heating unit when said first mentioned means is causing heated fluid medium to be supplied to the heating unit.

14. A combination heated fluid medium and hot fluid medium heating apparatus, comprising a heating unit including a blower adapted to be driven to cause air to be circulated in contact with said heating unit, means through the instrumentality of which the heating unit can utilize fluid-cooling medium from a circulating system of an internal combustion engine to provide heated fluid medium in said heating unit for causing air circulated by said blower in contact with the heating unit to be heated, a heating device including a boiler and a fuel burner for transforming a fluid into hot fluid medium and for causing the hot fluid medium provided to be supplied to the heating unit, and temperature responsive means responsive to the temperature of the fluid medium for rendering the first mentioned means incapable of supplying heated fluid medium to said heating unit when the heating device is operative to cause hot fluid medium to be supplied to the heating unit and for rendering said heating device incapable of supplying hot fluid medium to said heating unit when said first mentioned means is operative to cause heated fluid medium to be supplied to the heating unit.

15. A combination heated fluid medium and hot fluid medium heating apparatus, comprising a heating unit including a blower adapted to be driven to cause air to be circulated in contact with said heating unit, means for diverting fluid-cooling medium from a circulating system of an internal combustion engine and for utilizing the diverted fluid-cooling medium at the heating unit as heated fluid medium for raising the temperature of said heating unit, said means including a connection for conveying fluid-cooling medium from the internal combustion engine to the heating unit and a connection for conveying fluid-cooling medium from said heating unit to said internal combustion engine, a boiler adapted to contain fluid medium, a burner for heating said boiler to provide hot fluid medium for raising the temperature of said heating unit, a connection for directing flow of hot fluid medium from the boiler to the heating unit, a connection for directing flow of fluid medium from said heating unit to said boiler, said burner being adapted to be operative to heat said boiler to transform fluid therein into hot fluid medium and said hot fluid medium being adapted to travel to said heating unit and thereafter return to said boiler, means for causing said burner to be operative to heat said boiler when said diverted fluid-cooling medium is at relatively lower temperatures and to be incapable of imparting heat to the boiler when the diverted fluid-cooling medium is at comparatively higher temperatures, and means for causing said connections for conveying fluid-cooling medium from said internal combustion engine to said heating unit and from the heating unit to the internal combustion engine to be shut off and said connections for directing flow of hot fluid medium from said boiler to said heating unit and flow of fluid medium from the heating unit to the boiler to be open when said burner is operative to heat said boiler and for causing said connections for conveying fluid-cooling medium from said internal combustion engine to said heating unit and from the heating unit to the internal combustion engine to be open and said connections for directing flow of hot fluid medium from said boiler to said heating unit and flow of fluid medium from the heating unit to the boiler to be shut off when said burner is incapable of imparting heat to said boiler.

16. In combination heated fluid medium and hot fluid medium heating apparatus, comprising a heating unit including a blower adapted to be driven to cause air to be circulated in contact with said heating unit, means for circulating fluid-cooling medium from a circulating system of an internal combustion engine and for utilizing the diverted fluid-cooling medium at the heating unit as heated fluid medium for raising the temperature of said heating unit, said means including a connection for conveying fluid-cooling medium from the internal combustion engine to the heating unit and a connection for conveying fluid-cooling medium from said heating unit to said internal combustion engine, a plurality of control bellows including a control bellows in each of said mentioned connections adapted to be expanded in response to increase of temperature of the fluid-cooling medium and to be contracted in response to decrease in temperature of said fluid-cooling medium, a plurality of valve means including a valve means in each of said mentioned connections adapted to be actuated by each of said control bellows, a boiler adapted to contain fluid medium, a burner for heating said boiler to provide hot fluid medium for raising the temperature of said heating unit, a connection for directing flow of hot fluid medium from the boiler to the heating unit, a connection for directing flow of fluid medium from said heating unit to said boiler, said burner being adapted to be operative to heat said boiler to transform fluid medium therein to hot fluid medium and said hot fluid medium being adapted to travel to said heating unit and from there return to said boiler, and means for causing said burner to be operative to heat said boiler when said diverted fluid-cooling medium is at relatively lower temperatures and said control bellows are as a result in relatively contracted positions and to be incapable of imparting heat to the boiler when the diverted fluid-cooling medium is at comparatively higher temperatures and the control bellows are as a result comparatively expanded, said valve means being adapted to cause said connections for conveying fluid-cooling medium from said internal combustion engine to said heating unit and from the heating unit to the internal combustion engine to be shut off and said connections for directing flow of hot fluid medium from said boiler to said heating unit and flow of fluid medium from the heating unit to the boiler to be open when said burner is operative to heat said boiler and to cause said connections for conveying fluid-cooling medium from said internal combustion engine to said heating unit and from the heating unit to the internal combustion engine to be open and said connections for directing flow of hot fluid medium from said boiler to said heating unit and flow of fluid medium from said heating unit to the boiler to be shut off when said burner is incapable of imparting heat to said boiler.

17. The combination as specified in claim 16, and there being an opening between said connection for conveying fluid-cooling medium from the internal combustion engine to the heating unit and said connetcion for conveying fluid-cooling medium from said heating unit to said internal combustion engine, said opening being of cross-sectional area less than that of the last mentioned connections and being at the side of each of said valve means which is adjacent the internal combustion engine and opposite each of said boiler connections.

18. The combination as specified in claim 16, wherein said burner includes a combustion chamber, a resistance element in said combustion chamber and a flue outlet adapted to be connected with an intake manifold of an internal combustion engine, and wherein said means for causing said burner to be operative to heat said boiler and to be incapable of imparting heat to the boiler is constituted as a control plunger actuated by a control bellows and adapted to cause said flue outlet to be open when the control bellows is in relatively contracted conditions and to be closed when the control bellows is in comparatively expanded conditions and a bi-metallic blade for controlling a circuit for said resistance element adapted to cause said circuit to be made when said fluid-cooling medium is at relatively lower temperatures and to be broken when the fluid-cooling medium is at comparatively higher temperatures.

19. A combination heated fluid medium and hot fluid medium heating apparatus, comprising a heating unit including a blower adapted to be driven to cause air to be circulated in contact with said heating unit, means for diverting fluid-cooling medium from a circulating system of an internal combustion engine and for utilizing the diverted fluid-cooling medium at the heating unit as heated fluid medium for raising the temperature of said heating unit, said means including a connection for conveying fluid-cooling medium from the internal combustion engine to the heating unit and a connection for conveying fluid-cooling medium from said heating unit to said internal combustion engine, a boiler adapted to contain a fluid medium, a burner for heating said boiler to provide hot fluid medium for raising the temperature of said heating unit, a connection for directing flow of hot fluid medium from the boiler to the heating unit, a connection for directing flow of fluid medium from said heating unit to said boiler, said burner being adapted to be operative to heat said boiler to transform fluid medium therein to hot fluid medium and said hot fluid medium being adapted to travel to said heating unit and to return to said boiler, means for causing said burner to be operative to heat said boiler when said diverted fluid-cooling medium is at relatively lower temperatures and to be incapable of imparting heat to the boiler when the diverted fluid-cooling medium is at comparatively higher temperatures, and means for causing said connections for conveying fluid-cooling medium from said internal combustion engine to said heating unit and from the heating unit to the internal combustion engine to be shut off when said burner is operative to heat said boiler and to be open when said burner is incapable of imparting heat to said boiler.

20. The combination with the fluid-cooling medium circulating system of an internal combustion engine, of a fluid medium heating apparatus comprising a heating unit including a blower adapted to be driven to cause air to be circulated in contact with said heating unit, a boiler, means connecting said boiler and fluid-cooling medium circulating system, a burner for heating said boiler, a vacuum producing entity, means connecting said burner with said vacuum producing entity, a connection for conveying hot fluid medium from the boiler to the heating unit, and means responsive ot the temperature of the fluid medium in said circulating system for causing said burner to be operative when the circulating system fluid-cooling medium is below a predetermined temperature value and for causing the burner to be inoperative when said circulating system fluid-cooling medium is above said predetermined temperature value.

21. A heating apparatus for application to a conveyance having an internal combustion engine with fluid-cooling medium circulating system, including in combination, a tube to be connected to a fuel supply pipe, a second tube to be connected to the intake manifold of said internal combustion engine, means providing a combustion chamber coupled to said first mentioned tube, a heat exchange element providing a passage between said combustion chamber and said second tube, a member providing a compartment in heat exchange relation to said heat exchange element, a heating unit, means connecting said compartment with said fluid-cooling medium circulating system and said heating unit, means for igniting fuel within said combustion chamber, means for controlling flow through said combustion chamber and heat exchange element, and mechanism responsive to the temperature of fluid medium of said circulating system through the instrumentality of which said flow control means will be actuated to cause burning fuel to flow through the combustion chamber and heat exchange element when the temperature of fluid medium to be heated is below a predetermined temperature and will be actuated to cause flow through said combustion chamber and heat exchange element to be prevented when the temperature of fluid medium to be heated is at and above said predetermined temperature.

22. Apparatus for us with the fluid-cooling system of an internal combustion engine comprising a heat radiator, a boiler, means connecting said heat radiator with said fluid-cooling system and boiler, means controlling fluid flow through said boiler, means controlling the heat given off by said boiler, and a single thermostatic means responsive to the temperature of the fluid in said cooling system for controlling both of said last-named means to increase the heat given off by said boiler and fluid flow therethrough with a decrease in said temperature and to decrease the heat given off by said boiler and fluid flow therethrough with an increase in said temperature.

23. A heating apparatus for application to a conveyance having an internal combustion engine with fluid-cooling medium circulating system, including in combination, a tube to be connected to a fuel supply pipe, a second tube to be connected to the intake manifold of said internal combustion engine, means providing a combustion chamber coupled to said first mentioned tube, a heat exchange element providing a passage between said combustion chamber and said second tube, a member providing a compartment formed with inlet and outlet openings and in heat exchange relation to said heat exchange element, a heating unit, means connecting said inlet and outlet openings with said fluid-cooling medium circulating system and said heating unit, respectively; means for igniting fuel within said combustion chamber, means for controlling the flow through said inlet and outlet openings, and means responsive to the temperature of fluid medium of said circulating system for actuating said flow control means to at least substantially shut off flow through the compartment when the circulating system fluid-cooling medium rises above a predetermined temperature and permit flow in substantial quantity when said fluid-cooling medium temperature drops below said predetermined temperature.

24. Apparatus for use with the fluid-cooling system of an internal combustion engine comprising a heat radiator, a boiler, a fuel burner for said boiler, means connecting said heat radiator with said fluid-cooling system and boiler, means controlling fluid flow through said boiler, means controlling the supply of fuel to said burner, and a single thermostatic means responsive to the temperature of the fluid in said cooling system for controlling both of said last-named means to increase the heat given off by said boiler and fluid flow therethrough with a decrease in said temperature and to decrease the heat given off by said boiler and fluid flow therethrough with an increase in said temperature.

25. A heating apparatus adapted to utilize fluid-cooling medium from and heated by and circulated by a circulating system of an internal combustion engine as heated fluid medium for causing the heating apparatus to be heated, said apparatus comprising a boiler, means connecting said boiler and fluid-cooling circulating system, a burner for causing said boiler to be heated, a connection for conveying hot fluid medium from the boiler to the heating apparatus, and means responsive to the temperature of the fluid-cooling medium in said circulating system for causing said burner to be operative when the circulating system fluid-cooling medium is below a predetermined temperature and for causing the burner to be inoperative when said circulating system fluid-cooling medium is above said predetermined temperature.

26. The apparatus for use with a fluid cooling system of an internal combustion engine comprising a heat radiator, a boiler, means connecting said heat radiator with said fluid cooling system and boiler, a valve controlling fluid flow through said boiler, a valve controlling the heat given off by said boiler, and a single thermostatic means responsive to the temperature of the fluid in said cooling system for controlling both of said valves to increase the heat given off by said boiler and fluid flow therethrough with a decrease in said temperature and to decrease the heat given off by said boiler and fluid flow therethrough with an increase in said temperature.

HARRY ROSE.